United States Patent
Maehara et al.

(10) Patent No.: US 11,773,931 B2
(45) Date of Patent: Oct. 3, 2023

(54) FLOATING-TYPE DISC BRAKE

(71) Applicant: AKEBONO BRAKE INDUSTRY CO., LTD., Tokyo (JP)

(72) Inventors: Toshifumi Maehara, Tokyo (JP); Tadasuke Fujiwara, Tokyo (JP); Kohei Noma, Tokyo (JP); Shogo Mashimo, Tokyo (JP)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 305 days.

(21) Appl. No.: 16/982,774

(22) PCT Filed: Mar. 27, 2019

(86) PCT No.: PCT/JP2019/013438
§ 371 (c)(1),
(2) Date: Sep. 21, 2020

(87) PCT Pub. No.: WO2019/189506
PCT Pub. Date: Oct. 3, 2019

(65) Prior Publication Data
US 2021/0010548 A1    Jan. 14, 2021

(30) Foreign Application Priority Data

Mar. 27, 2018    (JP) ................. 2018-059774

(51) Int. Cl.
*F16D 65/095* (2006.01)
*F16D 55/227* (2006.01)
(Continued)

(52) U.S. Cl.
CPC ......... *F16D 65/095* (2013.01); *F16D 55/227* (2013.01); *F16D 65/0006* (2013.01); *F16D 2055/007* (2013.01); *F16D 2055/0008* (2013.01)

(58) Field of Classification Search
CPC .. F16D 65/095; F16D 65/0006; F16D 55/227; F16D 2055/0008; F16D 2055/007
See application file for complete search history.

(56) References Cited

U.S. PATENT DOCUMENTS 3,915,263 A    10/1975 Courbot
4,060,154 A *  11/1977 Smith ................. F16D 55/2265
                                                    188/73.38
(Continued)

FOREIGN PATENT DOCUMENTS

CN    104632950 A    5/2015
CN    104755786 A    7/2015
(Continued)

OTHER PUBLICATIONS

International Search Report dated Jul. 2, 2019 for PCT/JP2019/013438.
(Continued)

*Primary Examiner* — Pamela Rodriguez
(74) *Attorney, Agent, or Firm* — Faegre Drinker Biddle & Reath LLP

(57) ABSTRACT

A floating disc brake includes an outer pad disposed on an axially outer side relative to a rotor, an inner pad disposed on an axially inner side relative to the rotor, a fixing member disposed on the axially inner side relative to the rotor, the fixing member being configured to support the inner pad to be movable in an axial direction and being fixed to a vehicle body, and a yoke supported to the fixing member by a slide pin to be movable in the axial direction, the yoke supporting the outer pad. The fixing member is provided with an anchor disposed on a radially outer side relative to the rotor, the anchor being configured to bear a brake tangential force that acts on the outer pad at the time of braking within a circumferential range of a lining constituting the outer pad.

24 Claims, 31 Drawing Sheets

(51) Int. Cl.
  *F16D 65/00*  (2006.01)
  *F16D 55/00*  (2006.01)

(56) References Cited

U.S. PATENT DOCUMENTS

| | | |
|---|---|---|
| 5,113,978 A | 5/1992 | Weiler et al. |
| 2007/0119665 A1 | 5/2007 | Barbosa et al. |
| 2010/0230220 A1 | 9/2010 | Keller et al. |
| 2015/0122597 A1 | 5/2015 | Shimamura et al. |
| 2015/0260244 A1 | 9/2015 | Maehara et al. |
| 2016/0169305 A1 | 6/2016 | Halfmann |
| 2016/0169307 A1 | 6/2016 | Falter et al. |

FOREIGN PATENT DOCUMENTS

| | | |
|---|---|---|
| CN | 105229330 A | 1/2016 |
| DE | 102013008161 A1 | 11/2014 |
| EP | 2019935 A1 | 2/2009 |
| EP | 2574812 A1 | 4/2013 |
| EP | 2682632 A2 | 1/2014 |
| EP | 2682633 A2 | 1/2014 |
| EP | 2706255 A2 | 3/2014 |
| GB | 2 102 902 A | 2/1983 |
| JP | S58-094642 A | 6/1983 |
| JP | H01-131038 U | 9/1989 |
| JP | H03-501643 | 4/1991 |
| JP | H05-209640 A | 8/1993 |
| JP | H07-41083 U | 7/1995 |
| JP | 2001-304308 A | 10/2001 |
| JP | 2002-323074 A | 11/2002 |
| JP | 2002-372082 A | 12/2002 |
| JP | 2005-264965 A | 9/2005 |
| JP | 2010-121705 A | 6/2010 |
| JP | 2012-117658 A | 6/2012 |
| JP | 2013-072502 A | 4/2013 |
| WO | WO-2009-050226 A1 | 4/2009 |

OTHER PUBLICATIONS

Written Opinion dated Jul. 2, 2019 for PCT/JP2019/013438.
First Office Action dated Nov. 16, 2021 in Chinese Patent Application No. 201980021590.7 (6 pages) with an English translation (6 pages).
Office Action dated Feb. 1, 2022 in Japanese Application No. 2018-059773 (4 pages) with an English translation (4 pages).
Extended European Search Resport dated Dec. 6, 2021 in European Patent Application No. 19776385.7.
First Office Action dated Oct. 26, 2021 in Chinese Patent Application No. 201980021586.0 (6 pages) with an English translation (6 pages).

\* cited by examiner

—PRIOR ART—

FLOATING-TYPE DISC BRAKE

TECHNICAL FIELD

The present invention relates to a floating type disc brake for braking a vehicle.

BACKGROUND ART

FIG. 33 shows a floating type disc brake having a structure in the related art and is described in Japanese Patent Application No. 2002-372082. A floating type disc brake 1 includes a support 2, a yoke (caliper) 3, an inner pad 4, and an outer pad 5.

The support 2 is fixed to a suspension device of a vehicle body such as a knuckle in a state of being adjacent to an axially inner side of a rotor 6 that rotates together with a wheel.

Throughout the present specification and the claims, terms "axial direction (Z)", "radial direction (Y)" and "circumferential direction (X)" refer to axial, radial, and circumferential directions of a rotor unless otherwise specified. For members constituting the floating type disc brake, an axially inner side (ZI) refers to a central side of a vehicle in a vehicle width direction and an axially outer side (ZO) refers to an outer side of the vehicle in the vehicle width direction. A radially inner side (YI) refers to a radially inner side relative to the rotor and a radially outer side (YO) refers to a radially outer side relative to the rotor. A circumferentially inner side (XI) refers to a circumferentially central side of the floating type disc brake in an assembled state and a circumferentially outer side (XO) refers to two circumferentially outer sides of the floating type disc brake in the assembled state.

The yoke 3 includes a bifurcate claw portion 7 on an axially outer portion and a cylinder 8 on an axially inner portion. The yoke 3 is supported by the support 2 to be movable in the axial direction. For this purpose, in the illustrated example, a pair of slide pins 9 are slidably inserted into a pair of slide holes 10 provided in the support 2. Each of the pair of slide pins 9 includes a base end portion supported and fixed to the yoke 3.

The inner pad 4 is provided on the axially inner side relative to the rotor 6 and is supported by the support 2 to be movable in the axial direction. In contrast, the outer pad 5 is provided on the axially outer side relative to the rotor 6 and is supported to an axially inner surface of the claw portion 7 constituting the yoke 3. Therefore, a pad spring 11 fixed to an axially outer surface (a back surface) of the outer pad 5 is engaged with the claw portion 7. A pair of axial projections (dowels) 12 formed on the axially outer surface of the outer pad 5 are respectively fitted and recessed into a pair of reception holes (dowel holes) 13 formed in the axially inner surface of the claw portion 7.

When braking is performed, pressure oil is fed into a cylinder 8 and the inner pad 4 is pressed downward from above in FIG. 33 against an axially inner surface of the rotor 6 by a piston (not shown). As a reaction of the pressing force, the yoke 3 moves upward in FIG. 33 based on the sliding between the slide pins 9 and the slide holes 10, while the outer pad 5 is pressed against an axially outer surface of the rotor 6 by the claw portion 7. As a result, the rotor 6 is strongly clamped from two axial sides so that braking is performed.

CITATION LIST

Patent Literature

Patent Literature 1: JP-A-2002-372082

SUMMARY OF INVENTION

Technical Problem

In the floating type disc brake 1 having the structure in the related art, the outer pad 5 is supported directly by the claw portion 7 of the yoke 3 instead of being supported by the support 2, which is advantageous in reducing the size and weight of the support 2.

However, in the floating type disc brake 1 having the structure in the related art, the following problem may need improvement due to the adoption of the structure in which the outer pad 5 is supported to the yoke 3. That is, at the time of braking, a brake tangential force directed at the circumferential direction (rotation-out side) acts on the inner pad 4 and the outer pad 5. Although the brake tangential force that acts on the inner pad 4 is directly borne by the support 2 fixed to the suspension device, the brake tangential force that acts on the outer pad 5 is borne by abutment portions between the slide pins 9 and the slide holes 10 via the yoke 3. Axial positions of the abutment portions between the slide pins 9 and the slide holes 10 largely deviate to the axially inner side from an axial position of an acting point of the brake tangential force that acts on the outer pad 5. For this reason, the yoke 3 is likely to be inclined (tilted) in a direction indicated by an arrow a in FIG. 33 due to the brake tangential force that acts on the outer pad 5. As a result, a part of the outer pad 5 is likely to contact the rotor 6, uneven wear is likely to occur in the outer pad 5, and abnormal sound (noise) such as acoustic noise is likely to generate at the time of braking.

The present invention is made in view of the above circumstance and an object thereof is to complement a structure of a floating type disc brake capable of preventing an inclination of a yoke supporting an outer pad regardless of a brake tangential force that acts on the outer pad at the time of braking.

Solution to Problem

A floating type disc brake according to the present invention includes an outer pad, an inner pad, a fixing member, and a yoke.

The outer pad is disposed on an axially outer side relative to the rotor.

The inner pad is disposed on an axially inner side relative to the rotor.

The fixing member is disposed on the axially inner side relative to the rotor, supports the inner pad to be movable in an axial direction, and fixed to a vehicle body.

The yoke is supported to the fixing member via a slide pin to be movable in the axial direction in a state where supports the outer pad.

Particularly, in the present invention, the fixing member is provided with an anchor disposed on a radially outer side relative to the rotor, and the anchor is configured to bear a brake tangential force that acts on the outer pad at the time of braking within a circumferential range of a lining provided in the outer pad.

In the present invention, the anchor directly bears the brake tangential force that acts on the outer pad at the time of braking based on abutment with the outer pad.

Alternatively, in the present invention, the anchor indirectly bears the brake tangential force that acts on the outer pad at the time of braking via the yoke based on abutment with the yoke.

The fact that the anchor and the outer pad or the yoke are abutted against each other includes not only a case where the two members are in direct abutment with each other but also a case where the two members are abutted against each other via another member such as a stainless steel plate disposed between the two members to ensure slidability or the like.

In the present invention, the fixing member includes a support that supports the inner pad to be movable in the axial direction, and a pair of cylinders in which a piston is fitted, and the anchor is provided to the cylinder in a cantilever shape.

In this case, the anchor is provided at a radially outer end portion of the cylinder and includes a relief concave portion on a radially inner surface of the anchor, the relief concave portion being configured to mount a boot to an axially outer end portion of the cylinder.

Alternatively, in the present invention, the yoke includes a cylinder into which one piston is fitted, the fixing member includes a support that supports the inner pad to be movable in the axial direction, and the anchor is provided on the support.

In the present invention, the anchor is provided in a position where the anchor radially overlaps a circumferentially central portion of the lining provided in the outer pad.

In the present invention, a portion of the anchor that abuts against a mating surface (outer pad or yoke) at the time of braking has a convex arc-shaped cross-section.

In the present invention, a mating surface (outer pad or yoke) that abuts against the anchor at the time of braking has a convex arc-shaped cross-section.

In the present invention, a circumferential position of an abutment portion between the anchor and a mating surface (outer pad or yoke) at the time of forward braking is located on a rotation-in side relative to a circumferentially central portion of the lining provided in the outer pad.

In the present invention, the anchor has a circumferential size that is larger than or equal to a radial size of the anchor.

In the present invention, the anchor includes a tapered portion whose circumferential size decreases toward the axially outer side.

In the present invention, the anchor includes a constant-width portion at an axially outer end portion (top end portion). The constant-width portion has a constant circumferential size in the axial direction.

In the present invention, the anchor has an asymmetrical shape in the circumferential direction.

In this case, the circumferential width size of the anchor on one side in the circumferential direction (XA), which is an acting direction of the brake tangential force that acts at the time of forward braking, is larger than the circumferential width size of the anchor on the other side in the circumferential direction (XB). A central axis of the anchor is interposed between the one side in the circumferential direction (XA) and the other side in the circumferential direction.

In the present invention, the anchor is a separated member from the fixing member and is attached to the fixing member.

In this case, a positioning means is provided between the anchor and the fixing member, and the positioning means is configured to position the anchor with respect to the fixing member in a circumferential direction.

The positioning means can adopt mechanical engagement (concave-convex engagement) using a key, a key groove, or the like.

Further, the anchor is fixed to the fixing member by a fastening member such as a bolt. In this case, the fastening member may be disposed in the axial direction, the radial direction, or the circumferential direction.

When the fastening member is disposed in the axial direction, a radial position of a central axis of the fastening member is located within a radial size of the anchor.

Alternatively, in the present invention, the anchor is provided integrally with the fixing member.

In the present invention, a housing concave portion that houses the anchor is provided on a radially inner surface of a bridge portion of the yoke disposed on the radially outer side relative to the rotor.

In the present invention, the anchor can bear brake tangential forces that act on the outer pad at the time of forward braking and backward braking.

Alternatively, in the present invention, the anchor can bear only a brake tangential force that acts on the outer pad at the time of forward braking, and a brake tangential force that acts on the outer pad at the time of backward braking can be borne by the slide pin via the yoke.

In the present invention, the anchor can also bear a force (for example, a moment force) that is directed at the radially outer side and acts on the outer pad.

In the present invention, the inner pad bears a moment that acts at the time of braking by three bearing portions, and one bearing portion of the three bearing portions which is an abutment portion with the anchor is located on the radially outer side relative to a lining provided in the inner pad.

Advantageous Effects of Invention

According to the floating type disc brake of the present invention having the above-described configuration, it is possible to prevent the inclination of the yoke supporting the outer pad regardless of the brake tangential force that acts on the outer pad at the time of braking.

DESCRIPTION OF EMBODIMENTS

First Embodiment

Figure 1:
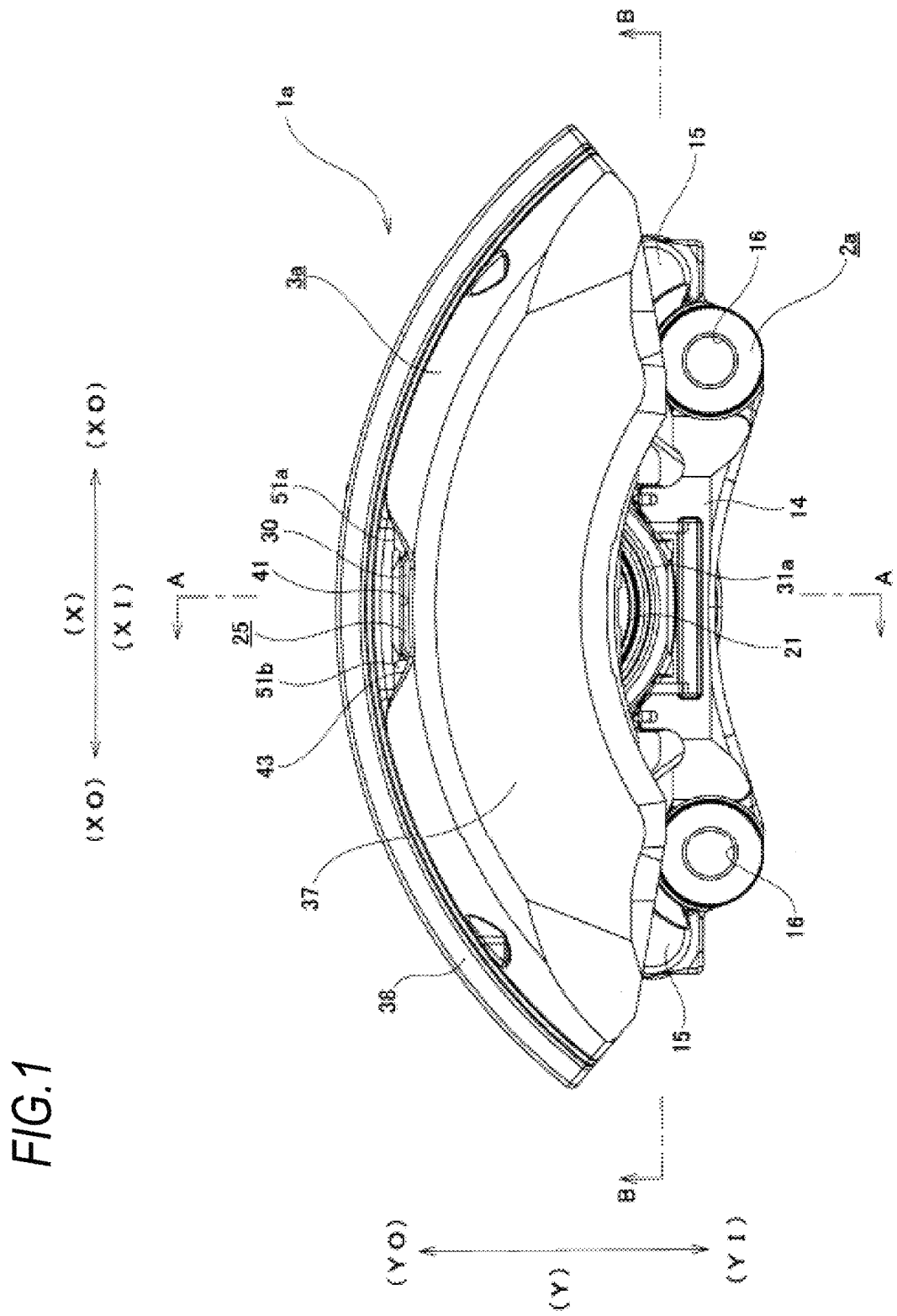
FIG. 1 is a front view of a floating type disc brake according to a first embodiment of the present invention when viewed from the axially outer side.
Figure 2:
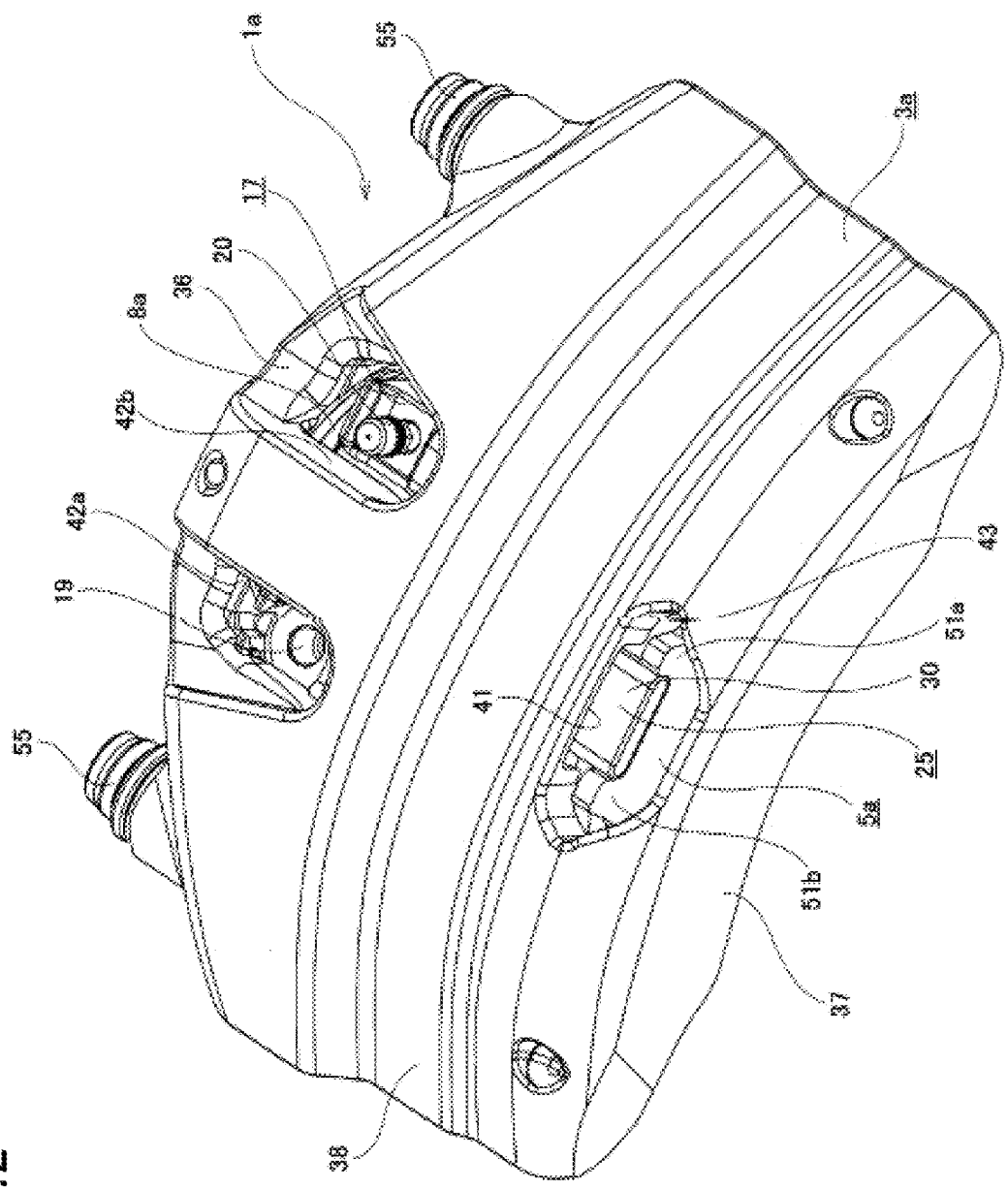
FIG. 2 is a perspective view of the floating type disc brake according to the first embodiment of the present invention.
Figure 3:
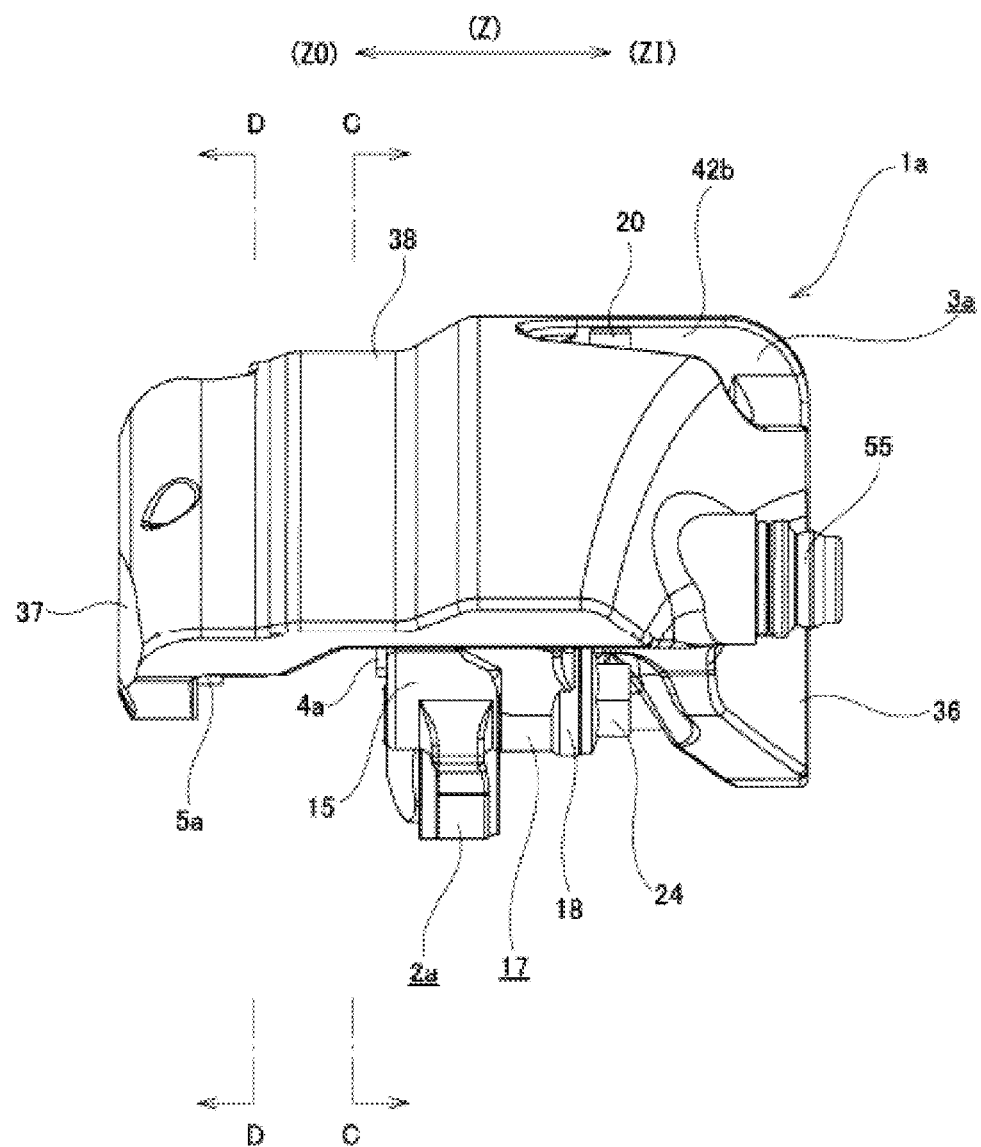
FIG. 3 is a side view of the floating type disc brake according to the first embodiment of the present invention when viewed from the circumferential direction.
Figure 4:
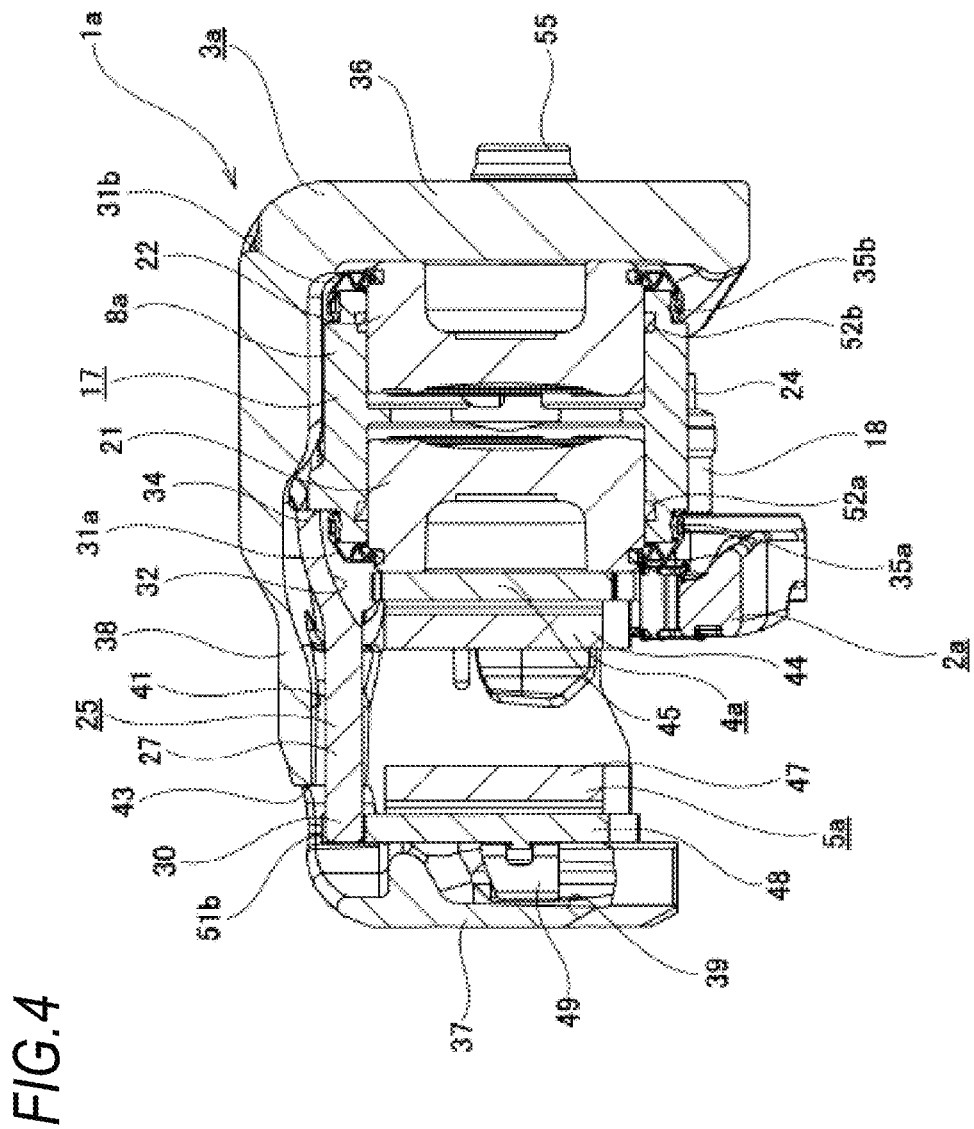
FIG. 4 is a cross-sectional view taken along a line A-A in FIG. 1.
Figure 5:
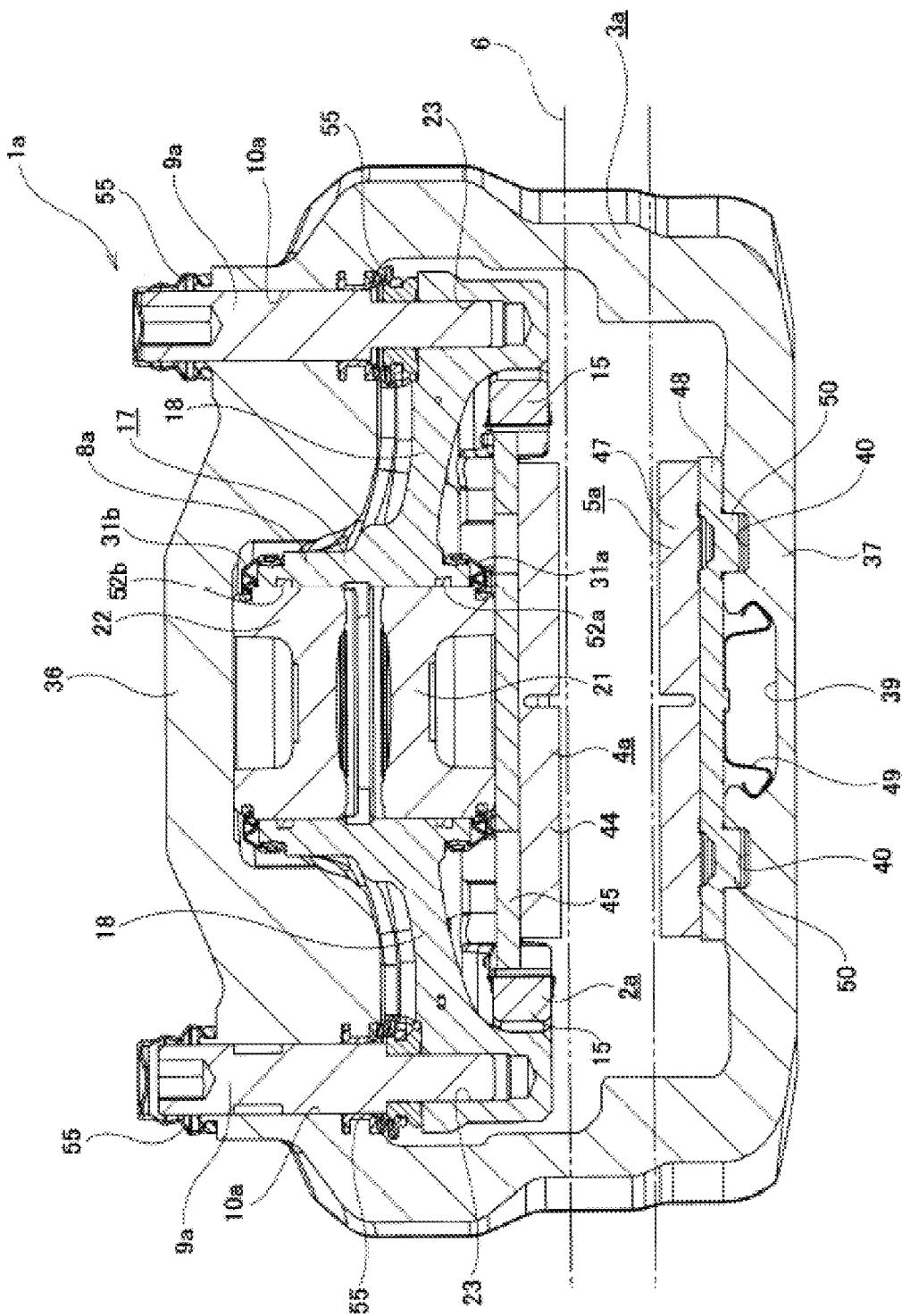
FIG. 5 is a cross-sectional view taken along a line B-B in FIG. 1.

A first embodiment of the present invention will be described with reference to FIGS. 1 to 16.

A floating type disc brake 1a according to the first embodiment is used for braking an automobile and includes a support 2a, a yoke 3a, an inner pad 4a, an outer pad 5a, a cylinder unit 17, and a pair of slide pins 9a. Among these members, the support 2a, the inner pad 4a, the cylinder unit 17, and the pair of slide pins 9a are provided on the axially inner side with reference to a disc-shaped rotor 6 that rotates together with a wheel, the outer pad 5a is provided on the axially outer side, and the yoke 3a is provided on the radially outer side.

The support 2a is made of metal, provided on the axially inner side relative to the rotor 6, and is fixed to a vehicle body. The support 2a has a substantially U shape in a front view, and includes a support base portion 14 provided on the radially inner side and extending in the circumferential direction and a pair of support arm portions 15 extending toward the radially outer side from two circumferentially outer portions of the support base portion 14. The two circumferentially outer portions of the support base portion 14 are each formed with an attachment hole 16 to fix the support 2a to a suspension device such as a knuckle. The support arm portions 15 are each formed with a fastening hole to fix the cylinder unit 17 to the support 2a. The support arm portions 15 each include, on a circumferentially inner surface, an engagement concave portion 65 that bears a brake tangential force and a torque that act on the inner pad 4a at the time of braking.

The cylinder unit 17 includes a substantially cylindrical cylinder 8a and a pair of cylinder arm portions 18 protruding to two circumferentially outer sides from a circumferentially outer surface of the cylinder 8a. The cylinder 8a is provided with a piping port 19 and a bleeder 20 on a radially outer portion on the circumferentially outer surface. The piping port 19 and the bleeder 20 are spaced apart from each other in the circumferential direction. The cylinder unit 17 is fixed to the support 2a as will be described later and constitutes a fixing member together with the support 2a. Therefore, in the structure according to the first embodiment, the yoke 3a and the cylinder 8a are separated members from each other.

An internal space of the cylinder 8a is opened on two axial sides, into which a first piston 21 and a second piston 22 are fitted to be movable in the axial direction. In the internal space of the cylinder 8a, a part between the first piston 21 and the second piston 22 is referred to as a hydraulic chamber to introduce pressure oil. Two axial end portions of the cylinder 8a and corresponding top end portions of the first piston 21 and the second piston 22 are bridged by boots 31a, 31b. The cylinder 8a includes small-diameter portions 35a, 35b on the two axial end portions. The small-diameter portions 35a, 35b have smaller outer diameters than an axially intermediate portion of the cylinder 8a. Further, seal members 52a, 52b are provided between a circumferentially inner surface of the cylinder 8a and corresponding circumferentially outer surfaces of the first piston 21 and the second piston 22. When the cylinder and an anchor to be described later are integrally provided, although not shown, end portions of the boots are fixed to circumferentially inner surfaces of the axial end portions of the cylinder.

At top end portions of the cylinder arm portions 18, female screw holes 23 for fixing top end portions of the slide pins 9a and insertion holes (not shown) are provided to be adjacent to each other in the radial direction. The top end portions of the cylinder arm portions 18 are superposed on top end portions of the support arm portions 15 from the axially inner side. In this state, fixing screws 24 axially inserted into the insertion holes of the cylinder arm portions 18 are screwed into fastening holes of the support arm portions 15. By doing so, the cylinder unit 17 is fixed to the support 2a.

In the first embodiment, the cylinder 8a constituting cylinder unit 17 is provided with an anchor 25 that bears the brake tangential force that acts on the outer pad 5a at the time of braking. The anchor 25 has a substantially T-shape when viewed from the radial direction and is a separated member from the cylinder 8a. The anchor 25 is fixed to radially outer end portions of the axially outer end portions of the cylinder 8a by a pair of bolts 26 serving as fastening members. Therefore, the anchor 25 is provided on the cylinder 8a in a cantilever shape, and is disposed on the radially outer side relative to the rotor 6 and the radially inner side relative to the yoke 3a. The anchor 25 has a symmetrical shape in the circumferential direction (left-right symmetrical shape in FIG. 11), that is, a line symmetrical shape relative to a central axis $O_{25}$ of the anchor 25. The anchor 25 is provided in a position where a circumferential position of the central axis $O_{25}$ coincides with a circumferential position of a central axis of the cylinder 8a. For this reason, the anchor 25 (constant-width portion 30 to be described later) is provided in a position radially overlapping with a circumferentially central portion $S_{47}$ of a lining 47 of the outer pad 5a.

The anchor 25 includes a plate-shaped (rod-shaped) anchor body 27 disposed in a horizontal direction and a pair of attachment flanges 28. The anchor body 27 receives the brake tangential force directed at the circumferential direction. Accordingly, a cross-section of the anchor body 27 in an imaginary plane perpendicular to the axial direction has an oval shape whose circumferential size is larger than a radial size, so as to sufficiently increase the rigidity of the anchor 25 in the circumferential direction (to increase the secondary moment of the cross-section). Therefore, as will be described later, cross-sections of circumferentially outer surfaces of the anchor body 27 that abut against radial projections 51a, 51b provided on the outer pad 5a have a convex arc shape.

The anchor body 27 includes a tapered portion 29 from an axially inner end portion (base end portion) to an intermediate portion and the constant-width portion 30 at an axially outer end portion (top end portion). The tapered portion 29 has a decreasing circumferential size as approaching the axially outer side. The constant-width portion 30 has a constant circumferential size and a constant radial size in the axial direction. As will be described later, the constant-width portion 30 is disposed between the radial projections 51a, 51b provided on the outer pad 5a that moves together with the yoke 3a in the axial direction. Therefore, an axial size of the constant-width portion 30 is restricted in consideration of an axial movement amount of the outer pad 5a at the time of braking. The anchor body 27 includes, at a circumferentially intermediate portion on a radially inner surface of an axially inner end portion, a relief concave portion 32 for mounting the boot 31a to the small-diameter portion 35a of the cylinder 8a. In the first embodiment, the axially inner end portion of the anchor body 27 is curved and a radially outer side is convex, so that the relief concave portion 32 is formed on the radially inner surface of the anchor body 27.

The pair of attachment flanges 28 protrude to two circumferentially outer sides from the axially inner end portion of the anchor body 27, and are formed with bolt insertion holes respectively penetrating the attachment flanges 28 in the axial direction. In the first embodiment, the bolts 26 inserted through the bolt insertion holes are screwed into the female screw holes opened to an axially outer end surface of the cylinder 8a, so that the anchor 25 is fixed to the cylinder 8a by screws. Specifically, the cylinder 8a is provided with attachment seats 33 having the corresponding female screw holes on the axially outer side relative to the piping port 19 and the bleeder 20. The bolts 26 are screwed to the attachment seats 33. When the anchor 25 is fixed to the cylinder 8a, axially inner surfaces of the attachment flanges 28 abut against axially outer surfaces of the attachment seats 33, and an axially inner end surface of the anchor body 27 abuts against a stepped surface 34 formed on the circumferentially outer surface of the cylinder 8a. The axial inner surfaces of the attachment flanges 28, the axially outer surfaces of the attachment seats 33, the axially inner end surface of the anchor body 27, and the stepped surface 34 are each formed in a flat surface shape. The small-diameter portion 35a provided at the axially outer end portion of the cylinder 8a is disposed inside the relief concave portion 32.

Figure 8:
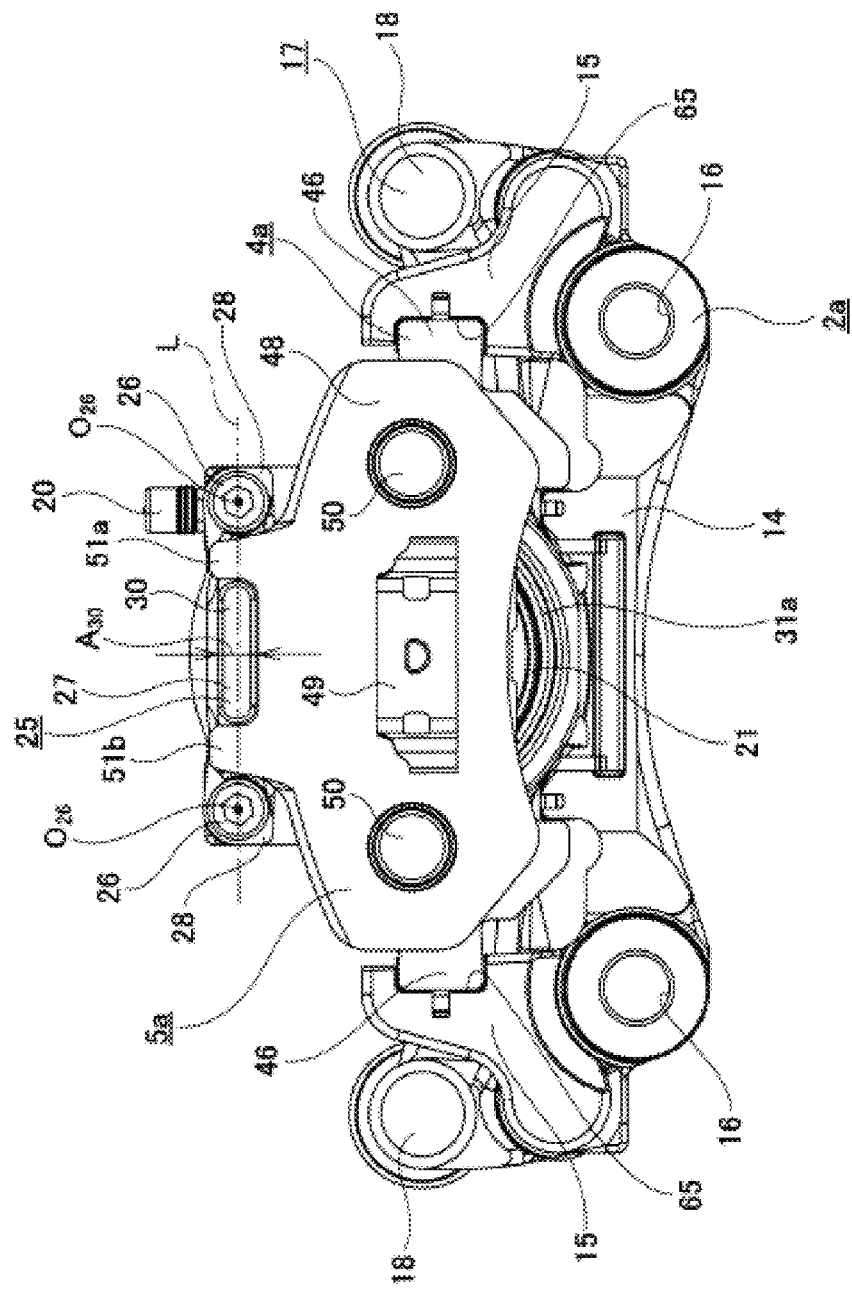
FIG. 8 is a view of FIG. 1 when a yoke is omitted.
Figure 9:
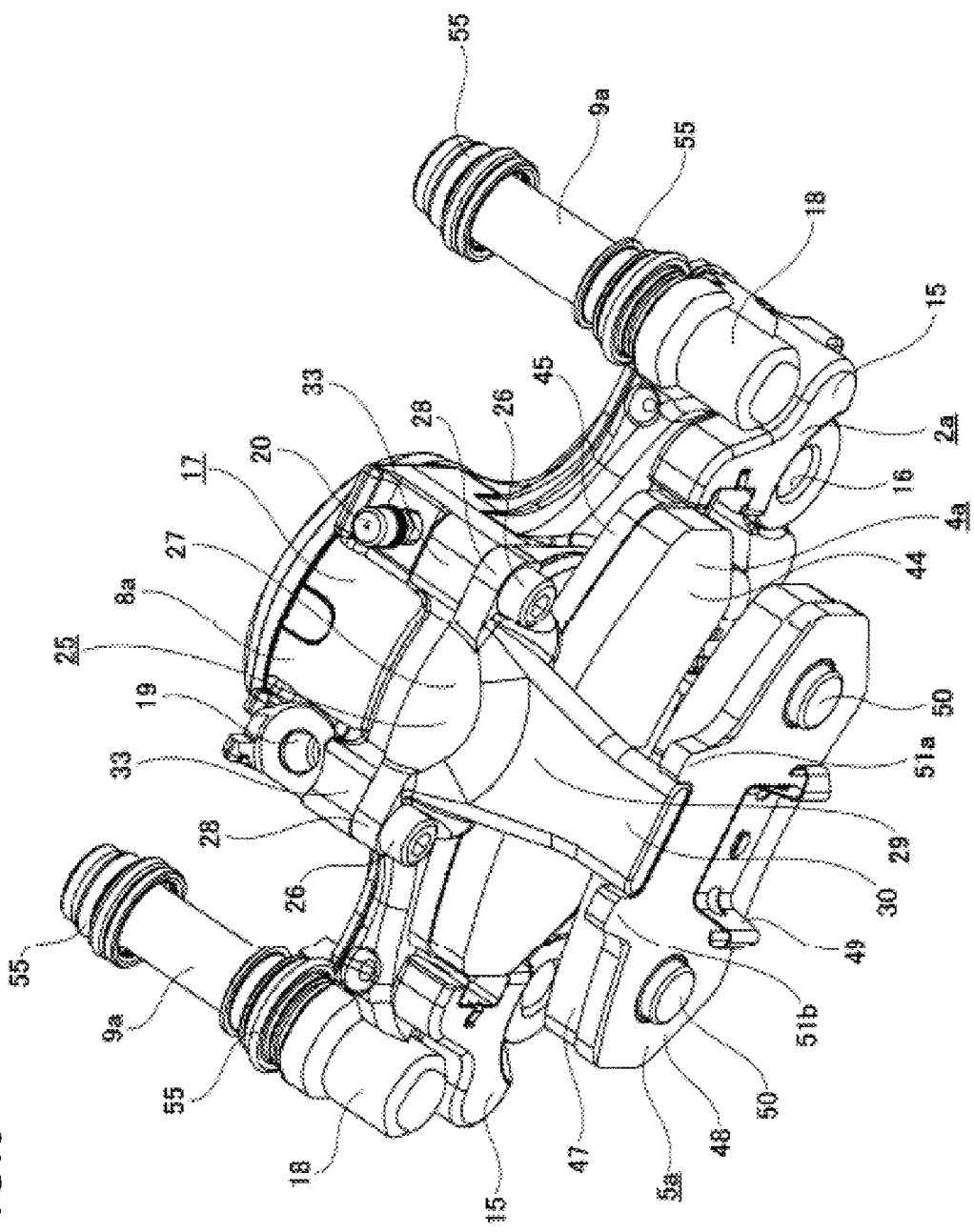
FIG. 9 is a view of FIG. 2 when the yoke is omitted.
Figure 10:
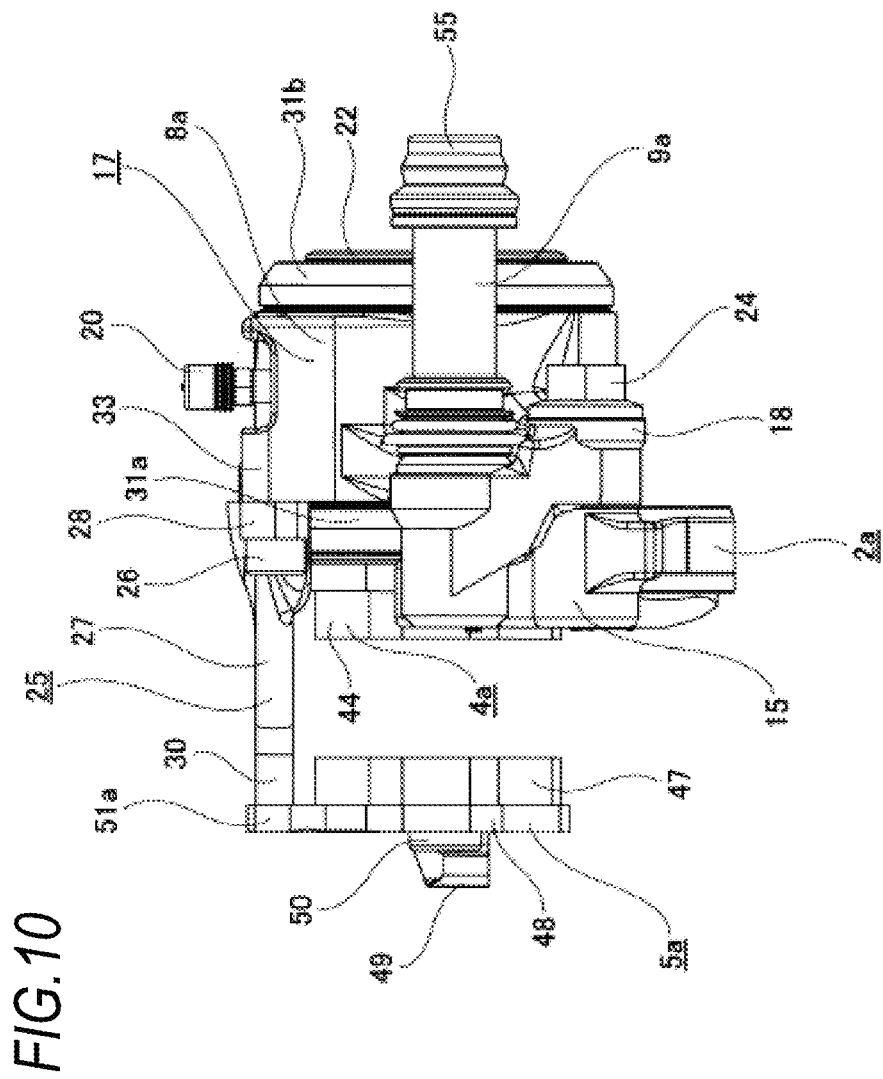
FIG. 10 is a view of FIG. 3 when the yoke is omitted.
Figure 11:
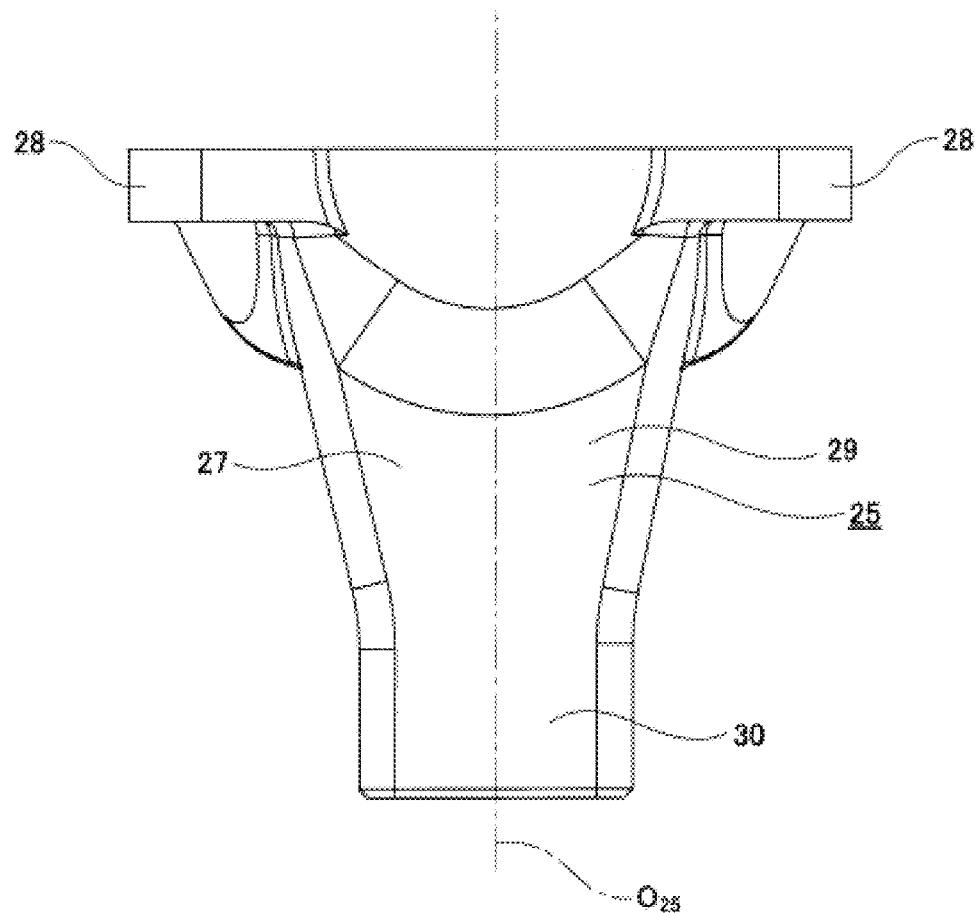
FIG. 11 is a plan view of an anchor when taken out of the floating type disc brake according to the first embodiment of the present invention and viewed from the radially outer side.
Figure 12:
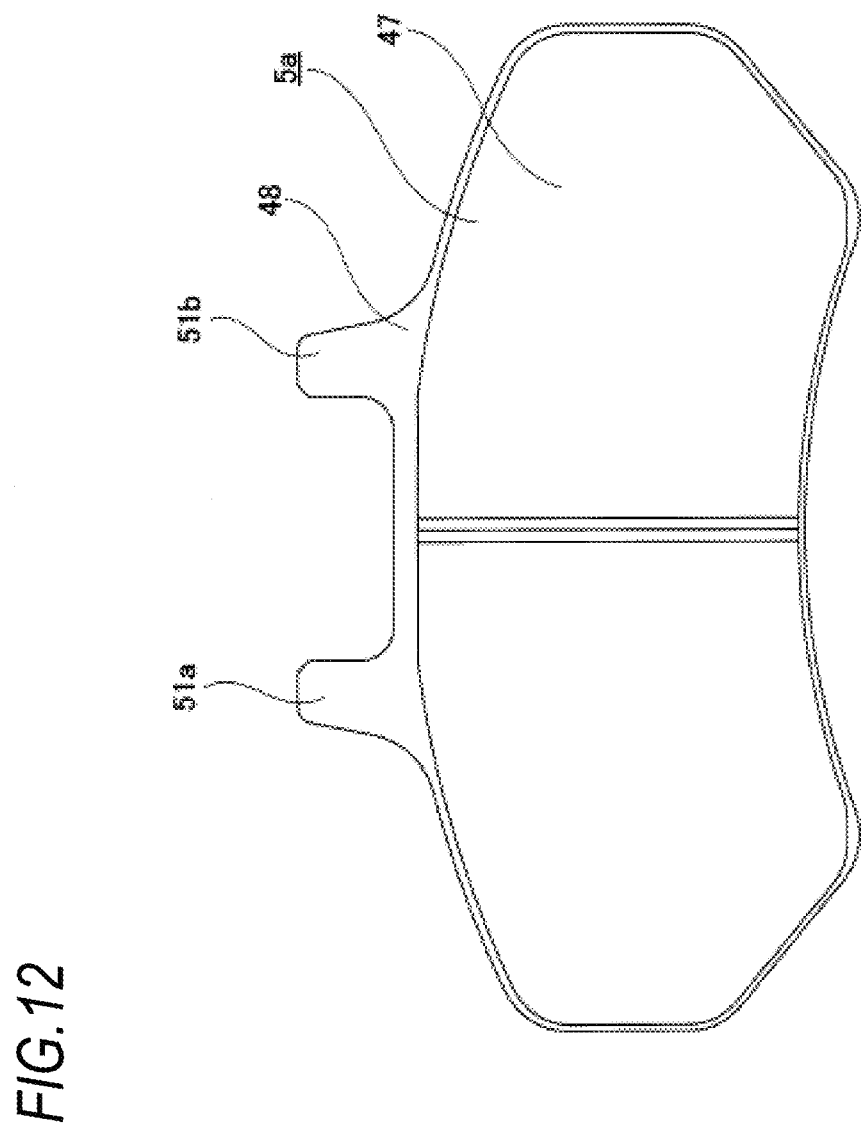
FIG. 12 is a front view of an outer pad when taken out of the floating type disc brake according to the first embodiment of the present invention and viewed from the axially inner side.
Figure 13:
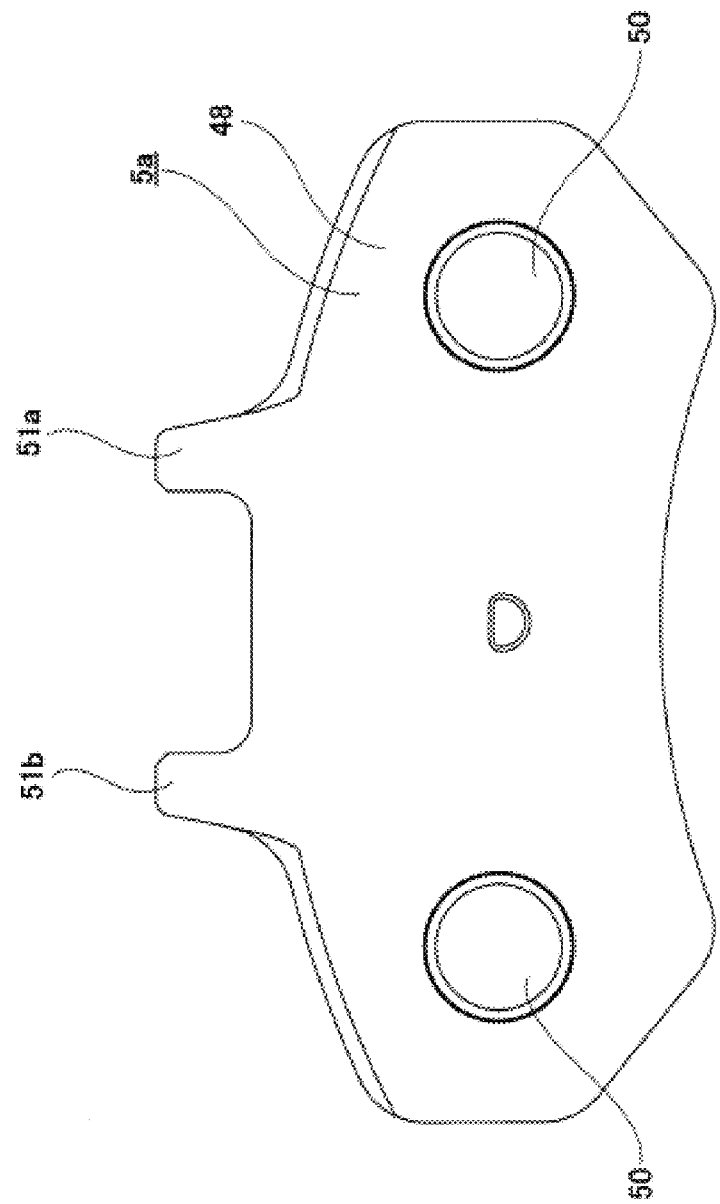
FIG. 13 is a back view of the outer pad when taken out of the floating type disc brake according to the first embodiment of the present invention and viewed from the axially outer side.
Figure 14:
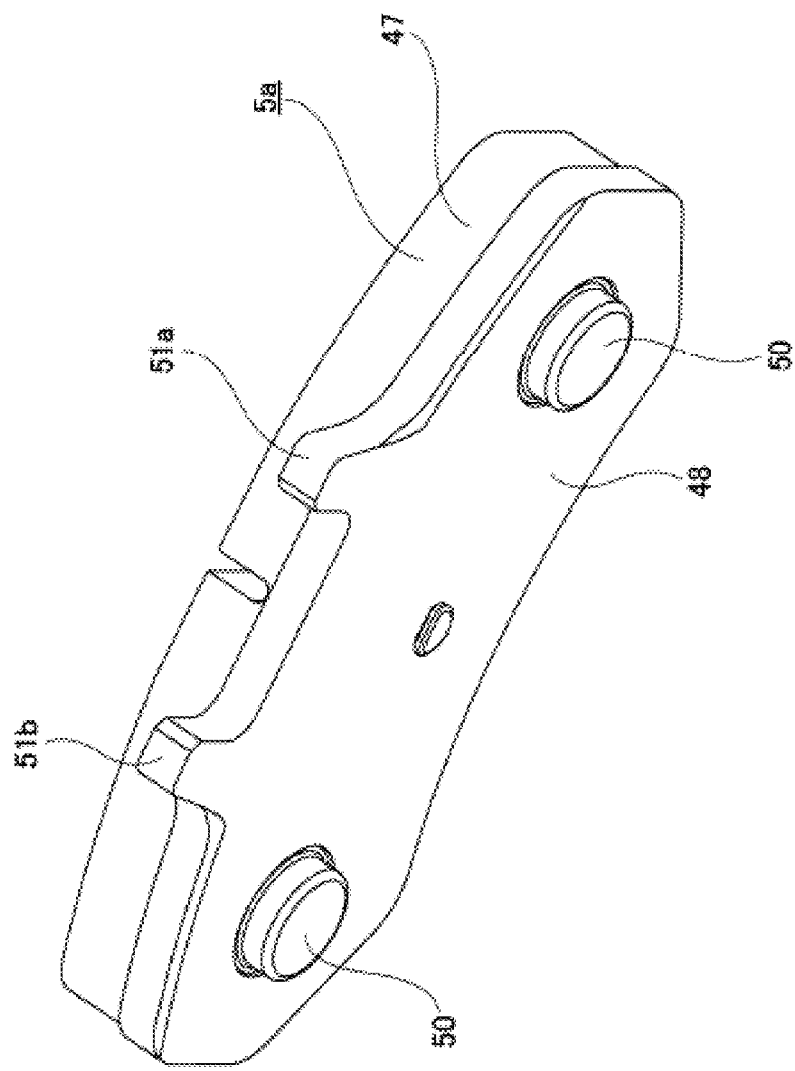
FIG. 14 is a perspective view of the outer pad when taken out of the floating type disc brake according to the first embodiment of the present invention.
Figure 15:
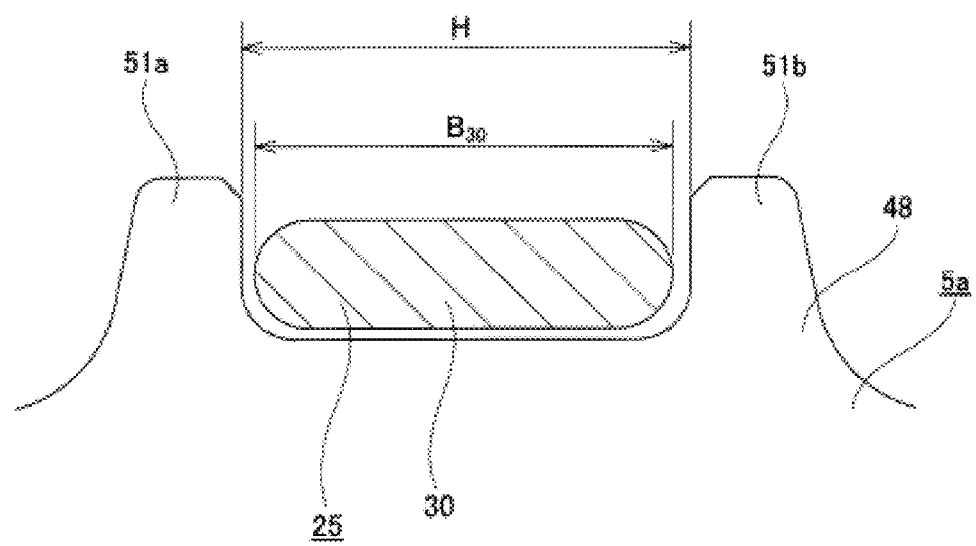
FIG. 15 is an enlarged view of a part corresponding to an upper portion of FIG. 7 and showing a relationship between a radial projection of the outer pad and a constant-width portion of the anchor.

In the first embodiment, as shown in FIG. 8, radial positions of central axes $O_{26}$ of the bolts 26 disposed in the axial direction are restricted within a range of a radial size $A_{30}$ of the constant-width portion 30 provided at the top end portion of the anchor body 27. In the illustrated example, radial positions of the central axes $O_{26}$ of the pair of bolts 26 coincide with a radially central portion (radial position of a top portion on a circumferentially outer surface of the convex arc shape) of the constant-width portion 30. The central axes $O_{26}$ of the pair of bolts 26 and the radially central portion of the constant-width portion 30 are arranged on the same imaginary straight line L. Accordingly, a radial position of an acting point of a brake tangential force that acts on the constant-width portion 30 and the radial positions of the bolts 26 that bear the brake tangential force coincide with each other or are close to each other, the brake tangential force born by the constant-width portion 30 is efficiently borne by the bolts 26, and a moment force is less likely to act on the anchor body 27.

The yoke 3a is made of metal or non-metal and has an arcuate shape when viewed from the axial direction. The yoke 3a covers the support 2a, the inner pad 4a, the outer pad 5a, and the cylinder unit 17 from the radially outer side. The yoke 3a includes an inner body 36 provided on the axially inner side relative to the support 2a and the cylinder unit 17, an outer body 37 provided on the axially outer side relative to the outer pad 5a, and a bridge portion 38 provided on the radially outer side relative to the rotor 6. The bridge portion 38 axially connects the inner body 36 and the outer body 37.

An axially outer surface of a circumferentially central portion of the inner body 36 is formed in a flat surface shape and faces the top end portion of the second piston 22 fitted to the cylinder 8a in the axial direction. The inner body 36 is provided with the slide holes 10a for slidably disposing the slide pins 9a at two circumferentially outer portions. The slide holes 10a penetrate the inner body 36 in the axial direction.

The outer body 37 is provided with, on an axially inner surface, a bottomed support hole 39 to support the outer pad 5a and a pair of reception holes (dowel holes) 40. The support hole 39 is a substantially rectangular concave portion and is provided at a circumferentially central portion on the axially inner surface of the outer body 37. The pair of reception holes 40 are cylindrical concave portions and are provided on two circumferentially outer sides relative to the support hole 39. Inner diameters of the reception holes 40 are slightly larger than outer diameters of axial projections 50 to be described later provided on the outer pad 5a.

The bridge portion 38 is provided on the radially outer side relative to the rotor 6 and includes a housing concave portion 41 at a circumferentially central portion on a radially inner surface of the bridge portion 38. The housing concave portion 41 extends in the axial direction and houses the anchor body 27. The housing concave portion 41 has a substantially rectangular cross-section and is slightly larger in the circumferential and radial directions than the cross-sectional shape of the anchor body 27. The bridge portion 38 includes a pair of inner window portions 42a, 42b at a circumferentially intermediate portion of an axially inner portion. The pair of inner window portions 42a, 42b radially penetrate the bridge portion 38 and are spaced apart from each other in the circumferential direction. The piping port 19 and the bleeder 20 provided on the cylinder unit 17 are exposed from the inner window portions 42a, 42b. The bridge portion 38 includes an outer window portion 43 at a circumferentially central portion of an axially outer portion. The outer window portion 43 penetrates the bridge portion 38 in the radial direction. The radial projections 51a, 51b to be described later constituting the outer pad 5a are exposed from the outer window portion 43.

The yoke 3a as described above is supported to the cylinder unit 17 to be movable in the axial direction by the pair of slide pins 9a. The cylinder unit 17 serves as a fixing member. Specifically, the slide pins 9a are inserted into the slide holes 10a provided on the inner body 36 from the axially inner side. Axially intermediate portions of the slide pins 9a are slidably disposed inside the slide holes 10a. The top end portions of the slide pins 9a are screwed into the female screw holes 23 provided at the top end portions of the cylinder arm portions 18 constituting the cylinder unit 17. Accordingly, the slide pins 9a are fixed to the cylinder unit 17 in the horizontal direction and the yoke 3a is supported by the slide pins 9a to be movable in the axial direction. Boots 55 are attached to corresponding parts of the slide pins 9a that are exposed to two axial sides from the slide holes 10a.

The inner pad 4a is provided on the axially inner side relative to the rotor 6 and includes a lining (a friction material) 44 and a metal back plate (a pressure plate) 45 supporting an axially inner surface that is a back surface of the lining 44. The inner pad 4a is provided on the radially outer side relative to the support base portion 14 as well as on the circumferentially inner side relative to the pair of support arm portions 15. By doing so, the inner pad 4a is supported to the support 2a to be movable in the axial direction, and movements in the radial and circumferential directions are restricted. Specifically, a pair of ear portions 46 provided on two circumferentially outer sides of the back plate 45 constituting the inner pad 4a are engaged with engagement concave portions 65 formed on circumferentially inner surfaces of the pair of support arm portions 15, so that the inner pad 4a is supported to the support 2a. In a state where the inner pad 4a is supported to the support 2a in this manner, the top end portion of the first piston 21 axially faces an axially inner surface of the back plate 45. The anchor 25 (the anchor body 27) is disposed on the radially outer side relative to a circumferentially intermediate portion of the inner pad 4a.

The outer pad 5a is provided on the axially outer side relative to the rotor 6 and includes the lining (the friction material) 47 and a metal back plate (a pressure plate) 48 supporting an axially outer surface that is a back surface of the lining 47. In the first embodiment, the outer pad 5a has a symmetrical shape in the circumferential direction. On the back plate 48, a pad spring 49 made of a leaf spring is crimped and fixed to a circumferentially center portion on an axially outer surface of the back plate 48. Further, the back plate 48 includes the pair of axial projections (the dowels) 50 at two circumferentially outer portions on the axially outer surface. Each of the axial projections 50 is formed in a substantially cylindrical shape and protrudes to the axially outer side from the axially outer surface of the back plate 48.

Particularly, in the first embodiment, the back plate 48 is provided with the pair of radial projections 51a, 51b protruding toward the radially outer side on an outer peripheral edge portion of the back plate 48, so as to reduce the percentage of the brake tangential force transmitted to the slide pins 9a via the yoke 3a in the braking tangential force that acts on the outer pad 5a at the time of braking. The pair of radial projections 51a, 51b are spaced apart from each other in the circumferential direction so that the constant-width portion 30 provided at the axially outer end portion of the anchor 25 can be disposed (inserted) between the pair of radial projections 51a, 51b to be movable in the axial direction.

Each of the radial projections 51a, 51b has a substantially rectangular shape. Circumferentially inner surfaces of the radial projections 51a, 51b in the circumferential direction are flat surfaces parallel to each other and circumferentially outer surfaces thereof are inclined surfaces inclined to approach each other toward the radially outer side. A distance H between the circumferentially inner surfaces of the pair of radial projections 51a, 51b is slightly larger than a circumferential size $B_{30}$ of the constant-width portion 30 ($H > B_{30}$). Particularly, in the first embodiment, in a state where the constant-width portion 30 is disposed in a neutral position between the pair of radial projections 51a, 51b, sizes of gaps between the circumferentially outer surfaces of the convex arc shape of the constant-width portion 30 and the flat surface-shaped circumferentially inner surfaces of the radial projections 51a, 51b are set to be smaller than those of gaps between the axial projections 50 and the reception holes 40.

To support the outer pad 5a on the axially inner surface of the outer body 37, the pair of axial projections 50 provided on the axially outer surface of the outer pad 5a are loosely recessed and fitted (inserted) in the pair of reception holes 40 formed on the axially inner surface of the outer body 37, and the pad spring 49 fixed on the axially outer surface of the outer pad 5a is elastically engaged inside the support hole 39. By inserting the axial projections 50 into the reception holes 40, movements of the outer pad 5a in the circumferential and radial directions relative to the outer body 37 are restricted. Further, by elastically engaging (snap-fitting) the pad spring 49 with the support hole 39, the outer pad 5a is positioned (centering function is exhibited) in the circumferential direction and is prevented from falling in the axially inner side. In a state where the outer pad 5a is attached to the axially inner surface of the outer body 37, the constant-width portion 30 of the anchor 25 is disposed between the pair of radial projections 51a, 51b.

In order to perform braking by the floating type disc brake 1a according to the first embodiment, pressure oil is introduced into the hydraulic chamber in the cylinder 8a. Accordingly, the first piston 21 and the second piston 22 are moved away from each other in the axial direction. Then, the inner pad 4a is pressed downward from above in FIG. 5 against an axially inner surface of the rotor 6 by the first piston 21. At the same time, the inner body 36 is pressed upward from below in FIG. 5 by the second piston 22, and the yoke 3a is moved to an upper side of FIG. 5 relative to the support 2a and the cylinder unit 17 serving as fixing members. Accordingly, the outer pad 5a is pressed upward from below in FIG. 5 against an axially outer surface of the rotor 6 via the outer body 37. As a result, the rotor 6 is strongly clamped from two axial sides so that braking is performed.

When the rotor 6 is clamped by the inner pad 4a and the outer pad 5a from two axial sides, brake tangential forces directed at the circumferential direction (rotation-out side)

are respectively applied to the inner pad 4*a* and the outer pad 5*a*. The brake tangential force that acts on the inner pad 4*a* is directly borne by the support 2*a*. In contrast, the brake tangential force that acts on the outer pad 5*a* is directly borne by the anchor 25. This will be described in detail with reference to FIG. 16.

Figure 16:
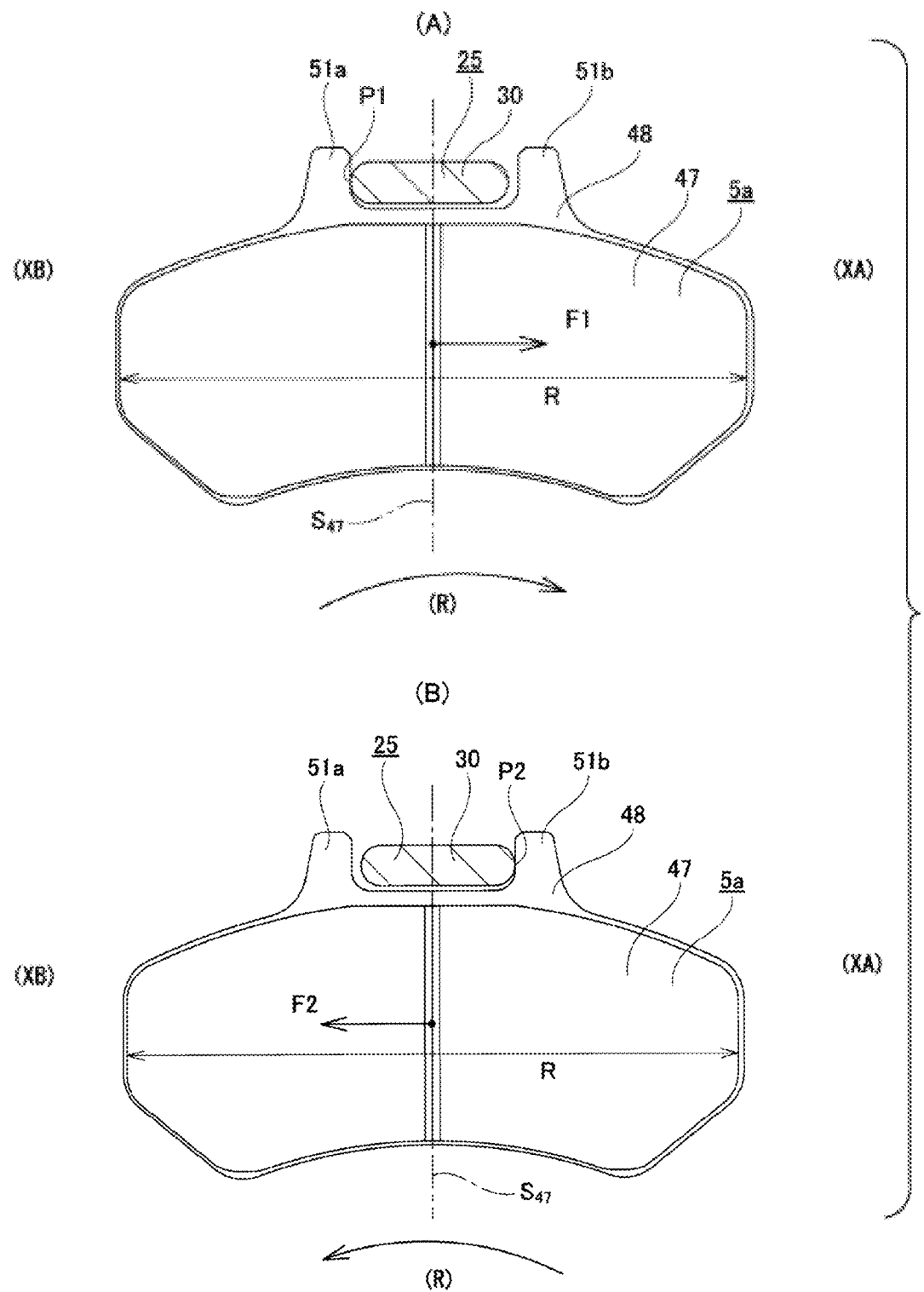
FIG. 16 shows a state at the time of braking according to the first embodiment of the present invention, (A) of FIG. 16 shows a state at the time of forward braking, and (B) of FIG. 16 shows a state at the time of backward braking.

As shown in (A) of FIG. 16, when a rotation direction (R) of the rotor 6 in a forward movement of the automobile is clockwise, a brake tangential force F1 at the time of forward braking that is directed at one side in the circumferential direction (XA: rotation-out side, right side of (A) of FIG. 16) acts on a friction surface center (figure center) of the lining 47 constituting the outer pad 5*a*. Accordingly, the outer pad 5*a* moves to the one side in the circumferential direction (XA) and the circumferentially inner surface of the radial projection 121*a* provided on the other side in the circumferential direction (XB: left side of FIG. 16) is abutted against the circumferentially outer surface of the constant-width portion 30. Therefore, the anchor 25 directly bears the brake tangential force F1 that acts at the time of forward braking based on the abutment with the radial projection 51*a* of the outer pad 5*a* on the other side in the circumferential direction (XB). At this time, a circumferential position of an abutment portion P1 between the circumferentially inner surface of the radial projection 51*a* and the circumferentially outer surface of the constant-width portion 30 is located on a rotation-in side (the other side in the circumferential direction (XB)) relative to the circumferentially central portion $S_{47}$ of the lining 47 and is within a circumferential range R of the lining 47.

Figure 7:
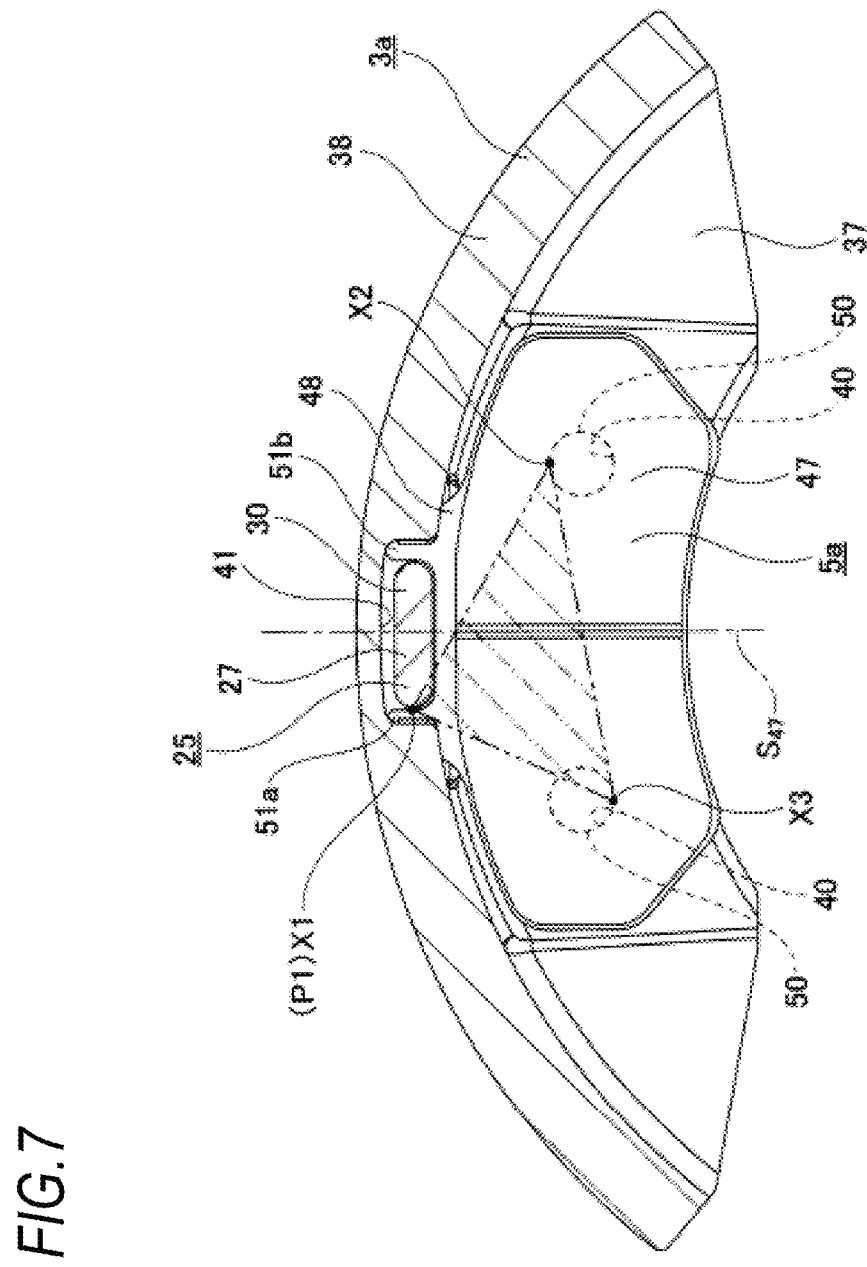
FIG. 7 is a cross-sectional view taken along a line D-D in FIG. 3.

In the first embodiment, since the flat surface-shaped circumferentially inner surface of the radial projection 51*a* and the convex arc-shaped circumferentially outer surface of the constant-width portion 30 abut against each other, a contact state can be made line contact and an abutment position can be made stable. Since the abutment portion P1 is located on the radially outer side relative to an acting line of the brake tangential force F1, a moment that attempts to rotate the outer pad 5*a* counterclockwise acts on the outer pad 5*a* at the time of forward braking. The moment can also be borne by the anchor 25 by abutting a radially inner surface of the constant-width portion 30 against the outer peripheral edge portion of the back plate 48, or be transmitted to the yoke 3*a* via abutment portions between the axial projections 50 and the reception holes 40. In the first embodiment, as shown in FIG. 7, the moment that acts on the outer pad 5*a* at the time of forward braking is borne by three bearing portions X1, X2, X3 including the first bearing portion X1 (abutment portion P1) between the circumferentially inner surface of the radial projection 51*a* and the circumferentially outer surface of the constant-width portion 30, the second bearing portion X2 between a radially outer end portion of the axial projection 50 and a radially outer end portion of the reception hole 40 on the one side in the circumferential direction (XA: rotation-out side, right side of FIG. 7), and the third bearing portion X3 between a radially inner end portion of the axial projection 50 and a radially inner end portion of the reception hole 40 on the other side in the circumferential direction (XB: rotation-in side, left side of FIG. 7). The size (area) of a triangle drawn by connecting the three bearing portions X1, X2, X3 is correlated with the easiness of an inclination of the outer pad 5*a* in the axial direction. As the triangle expands in the radial direction, an outer peripheral part or an inner peripheral part of the outer pad 5*a* is less likely to incline in the axial direction and uneven wear is less likely to occur in this part. As the triangle expands in the circumferential direction, a rotation-in part or a rotation-out part of the outer pad 5*a* is less likely to incline in the axial direction and uneven wear is less likely to occur in this part. In the first embodiment, the first bearing portion X1 of the three bearing portions X1, X2, X3 that bear the moment can be disposed on the radially outer side relative to the lining 47. Accordingly, an outer peripheral portion of the lining 47 can be effectively prevented from inclining to the axial direction (rotor 6 side). Therefore, uneven wear can be effectively prevented from occurring on the outer peripheral portion of the lining 47.

In contrast, as shown in (B) of FIG. 16, a brake tangential force F2 at the time of backward braking that is directed at the other side in the circumferential direction (XB: rotation-out side, left side of (B) of FIG. 16) acts on the friction surface center (figure center) of the lining 47 constituting the outer pad 5*a*. Accordingly, the outer pad 5*a* moves to the other side in the circumferential direction (XB) and the circumferentially inner surface of the radial projection 51*b* provided on the one side in the circumferential direction (XA: right side of FIG. 16) is abutted against the circumferentially outer surface of the constant-width portion 30. Therefore, the anchor 25 directly bears the brake tangential force F2 that acts at the time of backward braking based on the abutment with the radial projection 51*b* of the outer pad 5*a* on the one side in the circumferential direction (XA). A circumferential position of an abutment portion P2 between the circumferentially inner surface of the radial projection 51*b* and the circumferentially outer surface of the constant-width portion 30 is also located on the rotation-in side (the one side in the circumferential direction (XA)) relative to the circumferentially central portion $S_{47}$ of the lining 47 and is within the circumferential range R of the lining 47.

In the first embodiment, since the flat surface-shaped circumferentially inner surface of the radial projection 51*b* and the convex arc-shaped circumferentially outer surface of the constant-width portion 30 also abut against each other at the time of backward braking, the contact state can be made line contact and an abutment position can be made stable. A moment based on the brake tangential force F2 that acts at the time of backward braking is also borne by the anchor 25, as in the case of forward braking, or transmitted to the yoke 3*a* via the abutment portions between the axial projections 50 and the reception holes 40.

Figure 6:
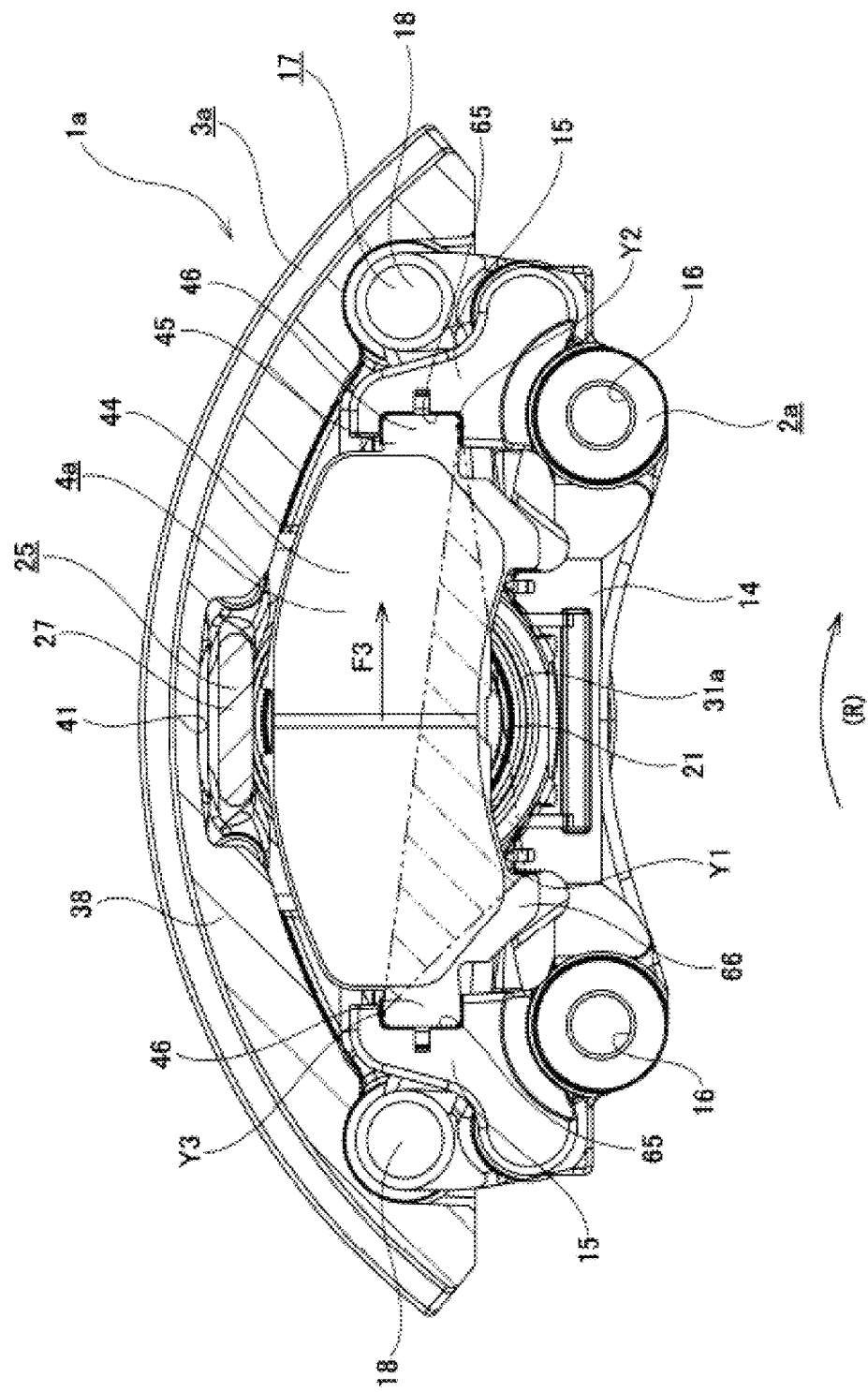
FIG. 6 is a cross-sectional view taken along a line C-C in FIG. 3.

Next, a moment that acts on the inner pad 4*a* at the time of forward braking will be described with reference to FIG. 6.

When the rotation direction (R) of the rotor 6 in the forward movement of the automobile is clockwise, a brake tangential force F3 at the time of forward braking that is directed at one side in the circumferential direction (rotation-out side, right side of FIG. 6) acts on a friction surface center (figure center) of the lining 44 constituting the inner pad 4*a*. Accordingly, the inner pad 4*a* moves to the one side in the circumferential direction, and a circumferentially inner surface of a projection 66 provided on a radially inner end portion of the back plate 45 on the other side in the circumferential direction (left side of FIG. 6) abuts against a part of the support base portion 14 constituting the support 2*a*. An abutment portion between the circumferentially inner surface of the projection 66 and the support base portion 14 is located on the radially inner side relative to an acting line of the brake tangential force F3. Accordingly, a moment that attempts to rotate the inner pad 4*a* clockwise acts on the inner pad 4*a* at the time of forward braking. In the first embodiment, the moment that acts on the inner pad 4*a* is borne by three bearing portions Y1, Y2, Y3 including the first bearing portion Y1 between the projection 66 and the support base portion 14, the second bearing portion Y2 between a radially inner surface of the ear portion 46 and a radially inner surface of the engagement concave portion 65 on the one side in the circumferential direction, and the third bearing portion Y3 between a radially outer surface of the ear portion 46 and a radially outer surface of the engagement concave portion 65 on the other side in the circumferential direction. In the first embodiment, the second bearing portion Y2 and the third bearing portion Y3 of the three bearing portions Y1, Y2, Y3 that bear the moment can be disposed at two circumferential end portions of the back plate 45. Therefore, uneven wear can be effectively prevented from occurring on a rotation-in part and a rotation-out part of the lining 44.

When braking is released, pressure oil is discharged from the hydraulic chamber of the cylinder 8a. Accordingly, the first piston 21 is pulled back into the internal space by an elastic force of the seal member 52a provided around the first piston 21 (rollback). Similarly, the second piston 22 is also pulled back into the internal space by an elastic force of the seal member 52b provided around the second piston 22.

According to the floating type disc brake 1a according to the first embodiment, it is possible to prevent the inclination (tilting) of the yoke 3a supporting the outer pad 5a regardless of the brake tangential forces F1, F2 that act on the outer pad 5a at the time of braking.

That is, as described above in the first embodiment, the brake tangential forces F1, F2 that act on the outer pad 5a at the time of forward braking and backward braking are directly borne by the anchor 25 provided on the cylinder 8a in a cantilever shape. Therefore, the percentage of the brake tangential forces F1, F2 transmitted to the yoke 3a through the abutment portions between the axial projections 50 provided on the outer pad 5a and the reception holes 40 provided in the outer body 37 can be reduced. Therefore, the inclination (tilting) of the yoke 3a can be effectively prevented. As a result, uneven wear can be prevented from occurring on the lining 47 constituting the outer pad 5a and abnormal sound (noise) such as acoustic noise at the time of braking can be prevented. Further, a sliding resistance between the slide pins 9a and the slide holes 10a can be prevented from increasing (generation of a cogging force) and accordingly, judder can also be prevented.

In the structure according to the first embodiment, when the brake tangential forces F1, F2 are applied, the radial projections 51a, 51b are abutted against the anchor 25 before the axial projections 50 and the reception holes 40 are abutted against each other. However, the axial projections 50 and the reception holes 40 may also be abutted against each other at the same time with or before the radial projections 51a, 51b and the constant-width portion 30 are abutted against each other. Also in this case, the inclination of the yoke 3a can be prevented since at least a part of the brake tangential forces F1, F2 can be borne by the anchor 25.

Further, since the cross-section of the anchor body 27 has an oval shape whose circumferential size is larger than the radial size, the radial size can be prevented from being excessively large and a main rigidity in the circumferential direction for bearing the brake tangential force can be ensured. Therefore, an outer diameter size of the yoke 3a that covers the anchor body 27 can be prevented from being excessively large. Further, since the housing concave portion 41 that houses the anchor body 27 is provided on the radially inner surface of the yoke 3a, the outer diameter size of the yoke 3a can be effectively prevented from increasing due to the provision of the anchor 25. As a result, an increase in the size of the floating type disc brake 1a can be prevented.

In the first embodiment, the abutment portions P1, P2 between the anchor 25 and the outer pad 5a are located within the circumferential range R of the lining 47. For this reason, it is possible to shorten a moment arm of a moment (winding force) that is generated on the outer pad 5a based on the brake tangential forces F1, F2 and is around a central axis directed at the radial direction. Accordingly, a pressing force of the lining 47 to the rotor 6 can be reduced to a low level. Therefore, uneven wear of the lining 47 can be prevented. Abnormal sound (noise) such as acoustic noise at the time of braking can be prevented. Since the abutment portions P1, P2 are located within the circumferential range R of the lining 47, a protruding amount of the radial projections 51a, 51b provided on the outer peripheral edge portion of the back plate 48 can be reduced. Therefore, an increase in the weight of the outer pad 5a can be prevented and an increase in the size of the floating type disc brake 1a can be prevented. For the cylinder unit 17 serving as a fixing member, it is not necessary to additionally provide a portion protruding in the circumferential direction or the like in order to fix the anchor 25. Accordingly, an increase in weight can also be prevented from this aspect.

Since the relief concave portion 32 is provided on the radially inner surface of the axially inner end portion of the anchor body 27, the boot 31a mounted on the axially outer end portion of the cylinder 8a can be prevented from interfering with the anchor body 27. Therefore, the anchor 25 is not necessarily disposed on the radially outer side.

Since the anchor 25 and the cylinder 8a are the separated members from each other, the anchor 25 and the cylinder 8a can be made of different materials and by different manufacturing methods such as casting or forging. This is advantageous to increase the size accuracy and the shape accuracy of the anchor 25 and to reduce the weight and increase the rigidity. In the first embodiment, the anchor 25 can prevent the outer pad 5a from vibrating in an upper-lower direction at the time of traveling of the automobile.

Second Embodiment

Figure 17:
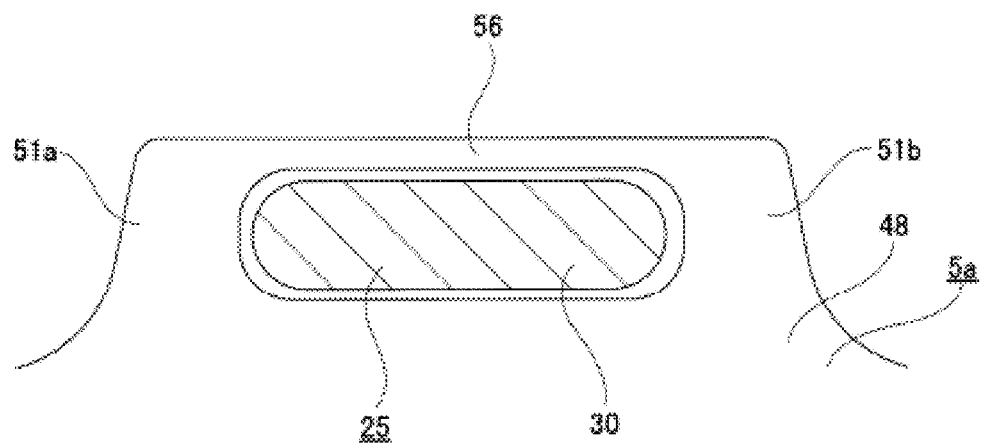
FIG. 17 shows a second embodiment of the present invention and corresponds to FIG. 15.

A second embodiment of the present invention will be described with reference to FIG. 17. In the second embodiment, radially outer end portions of the pair of radial projections 51a, 51b provided on an outer peripheral edge portion of the back plate 48 constituting the outer pad 5a are coupled to each other in the circumferential direction by a coupling portion 56.

In the second embodiment having the above configuration, rigidity of the radial projections 51a, 51b in the circumferential direction can be improved. For this reason, an elastic deformation amount of the radial projections 51a, 51b in the circumferential direction can be reduced. Accordingly, a brake tangential force that acts on the outer pad 5a can be more effectively prevented from being transmitted to the slide pins 9a (see FIG. 5).

Other configurations and functions and effects are the same as those of the first embodiment described above.

Third Embodiment

Figure 18:
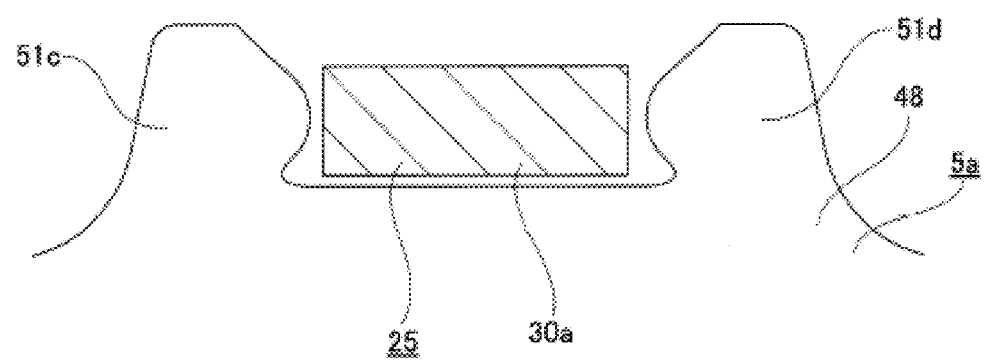
FIG. 18 shows a third embodiment of the present invention and corresponds to FIG. 15.

A third embodiment of the present invention will be described with reference to FIG. 18. In the third embodiment, cross-sectional shapes of radial projections 51c, 51d provided on the outer pad 5a and cross-sectional shapes of a constant-width portion 30a provided at an axially outer end portion of the anchor 25 are opposite to those in the structure of the first embodiment. That is, cross-sectional shapes of circumferentially inner surfaces of the radial projections 51c, 51d are convex arc shapes and cross-sectional shapes of circumferentially outer surfaces of the constant-width portion 30a are flat surface shapes.

Also in the third embodiment having the above configuration, a contact state between the radial projections 51c, 51d and the constant-width portion 30a can be made line contact. Accordingly, abutment positions between the radial projections 51c, 51d and the constant-width portion 30a can be made stable.

Other configurations and functions and effects are the same as those of the first embodiment described above.

Fourth Embodiment

Figure 19:
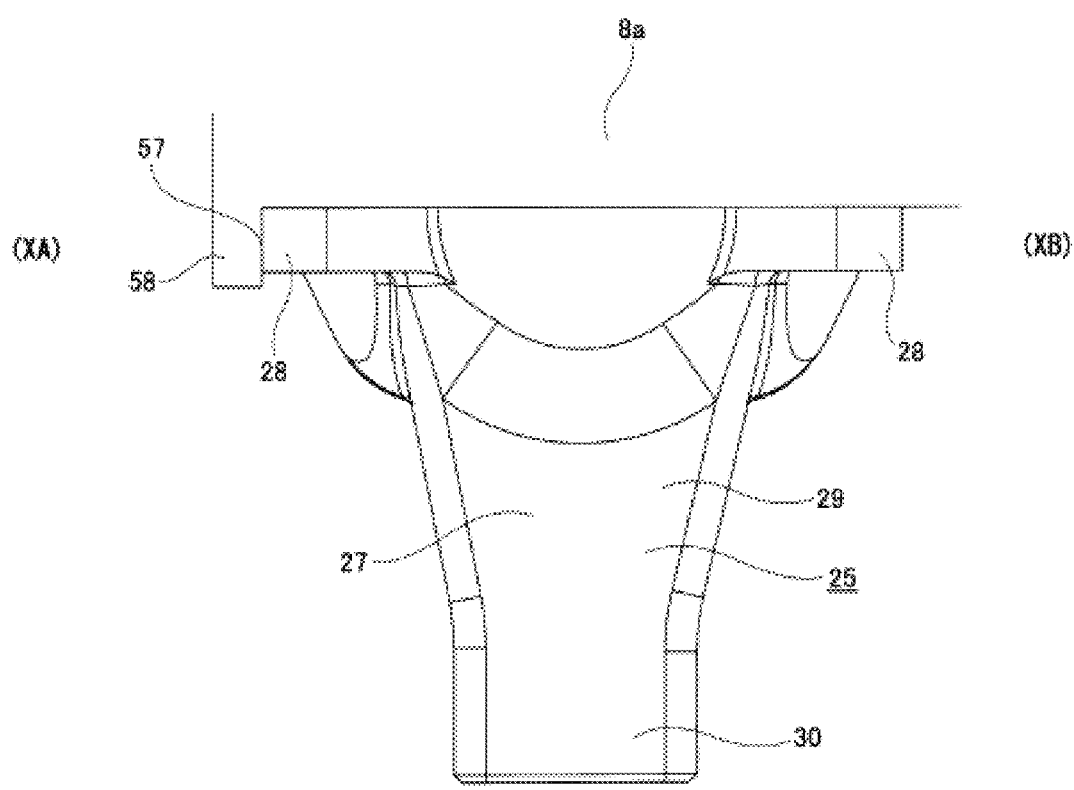
FIG. 19 shows a coupling portion of an anchor and a cylinder according to a fourth embodiment of the present invention when viewed from the radially outer side.

A fourth embodiment of the present invention will be described with reference to FIG. 19. In the fourth embodiment, a positioning means 57 is provided between the anchor 25 and the cylinder 8a to position the anchor 25 to the cylinder 8a in the circumferential direction by mechanical engagement. The positioning means 57 includes a wall portion 58 on one side in the circumferential direction (left portion in FIG. 19) of an axially outer end surface of the cylinder 8a. The wall portion 58 protrudes toward the axially outer side. A surface of the wall portion 58 on the other side in the circumferential direction (left surface in FIG. 19) is abutted against a circumferentially outer surface of the anchor 25.

In the fourth embodiment having the above-described configuration, the anchor 25 can be positioned to the cylinder 8a in the circumferential direction. Therefore, it is possible to strictly regulate a circumferential position of the constant-width portion 30 provided at an axially outer end portion of the anchor 25. The wall portion 58 is provided to the anchor 25 in an acting direction of a brake tangential force that acts at the time of forward braking. Accordingly, the anchor 25 can be effectively prevented from being displaced to the one side in the circumferential direction (XA) due to the brake tangential force. The positioning means is not limited to the structure described above and may have various structures known in the related art such as a structure in which a key (convex portion) or a key groove (concave portion) formed on an axially outer end surface of the cylinder and a key groove or a key formed on an axially inner end surface of the anchor.

Other configurations and functions and effects are the same as those of the first embodiment described above.

Fifth Embodiment

Figure 20:
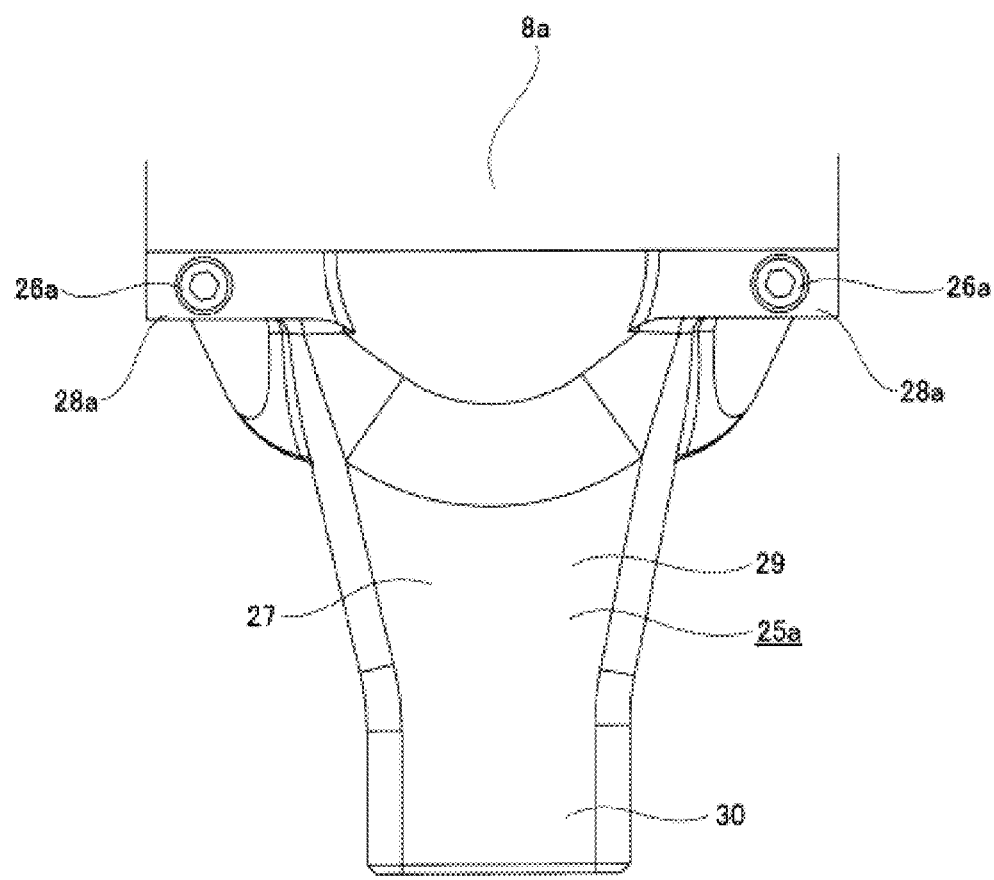
FIG. 20 shows a fifth embodiment of the present invention and corresponds to FIG. 19.

A fifth embodiment of the present invention will be described with reference to FIG. 20. In the fifth embodiment, the arrangement direction of bolts 26a that are fastening members used for fixing an anchor 25a to the cylinder 8a is not the axial direction but the radial direction (front-back direction in FIG. 20). For this reason, a pair of attachment flanges 28a constituting the anchor 25a are formed with bolt insertion holes penetrating the pair of attachment flanges 28a in the radial direction (front-back direction in FIG. 20). A pair of attachment seats provided on the cylinder 8a are formed with female screw holes in the radial direction. In a state where the attachment flanges 28a are superposed on radially outer surfaces of the attachment seats, the bolts 26a inserted through the bolt insertion holes of the attachment flanges 28a are screwed into the female screw holes of the attachment seats so that the anchor 25a is fixed to the cylinder 8a by screws.

In the fifth embodiment having the above-described configuration, since the arrangement direction of the bolts 26a is the radial direction, head portions of the bolts 26a can be exposed from the inner window portions 42a, 42b (see FIG. 2) formed in the yoke 3a. Therefore, tightened states of the bolts 26a can be adjusted and confirmed after the yoke 3a is assembled.

Other configurations and functions and effects are the same as those of the first embodiment described above.

Sixth Embodiment

Figure 21:
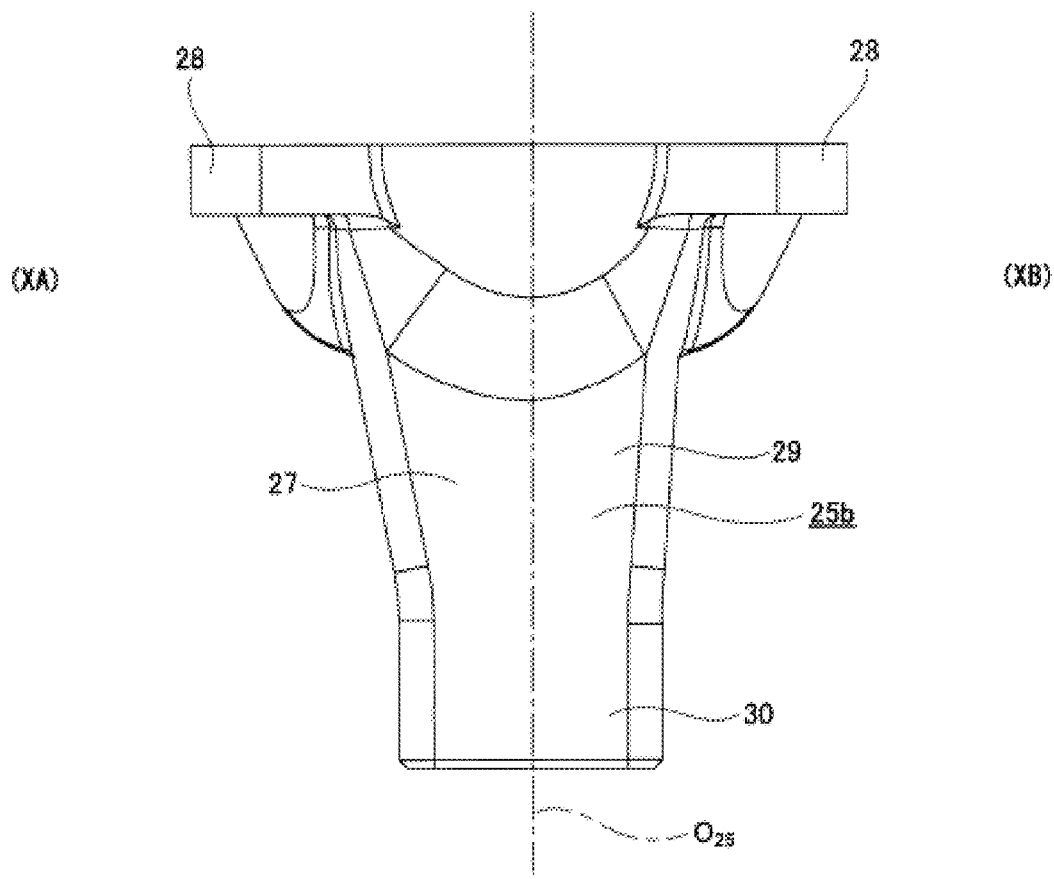
FIG. 21 shows a sixth embodiment of the present invention and corresponds to FIG. 11.

A sixth embodiment of the present invention will be described with reference to FIG. 21. In the sixth embodiment, an anchor 25b has an asymmetrical shape in the circumferential direction. That is, one half portion in the circumferential direction of the anchor 25b has a shape different from a shape of the other half portion in the circumferential direction of the anchor 25b with the central axis $O_{25}$ interposed therebetween. In the illustrated example, the circumferential size (thickness) of the one half portion in the circumferential direction (left half portion in FIG. 21) that is an acting direction of the brake tangential force F1 that acts at the time of forward braking is larger than the circumferential size of the other half portion in the circumferential direction (right half portion in FIG. 21) that is an acting direction of the brake tangential force F2 that acts at the time of backward braking.

In the sixth embodiment having the configuration as described above, two sides of the anchor 25b with a circumferentially central portion interposed in between have different shapes (sizes) depending on the magnitude of a brake tangential force borne by the anchor 25b without unnecessary design. This is advantageous in reducing the size and weight of the anchor 25b.

Other configurations and functions and effects are the same as those of the first embodiment described above.

Seventh Embodiment

Figure 22:
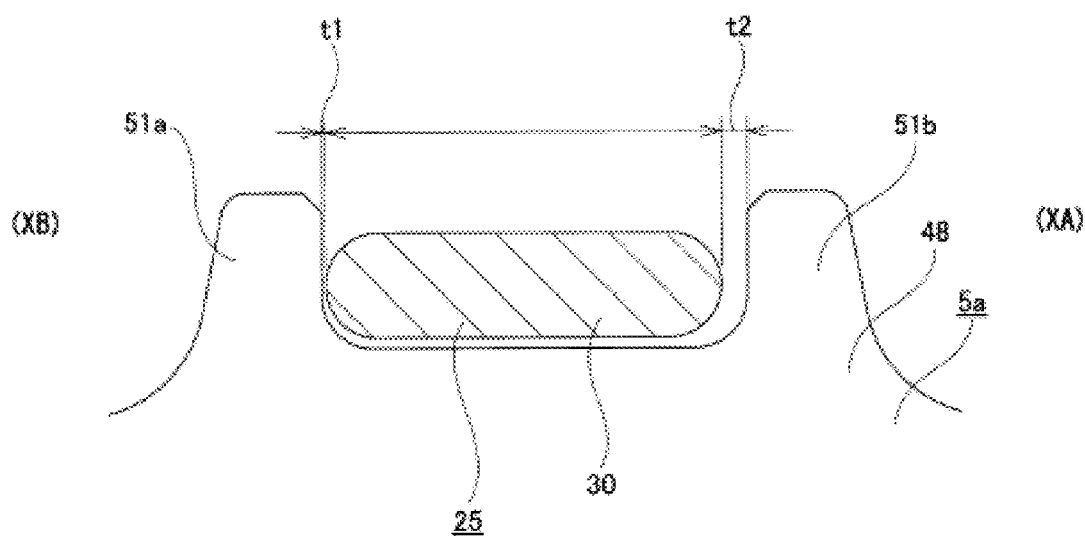
FIG. 22 shows a seventh embodiment of the present invention and corresponds to FIG. 15.
Figure 23:
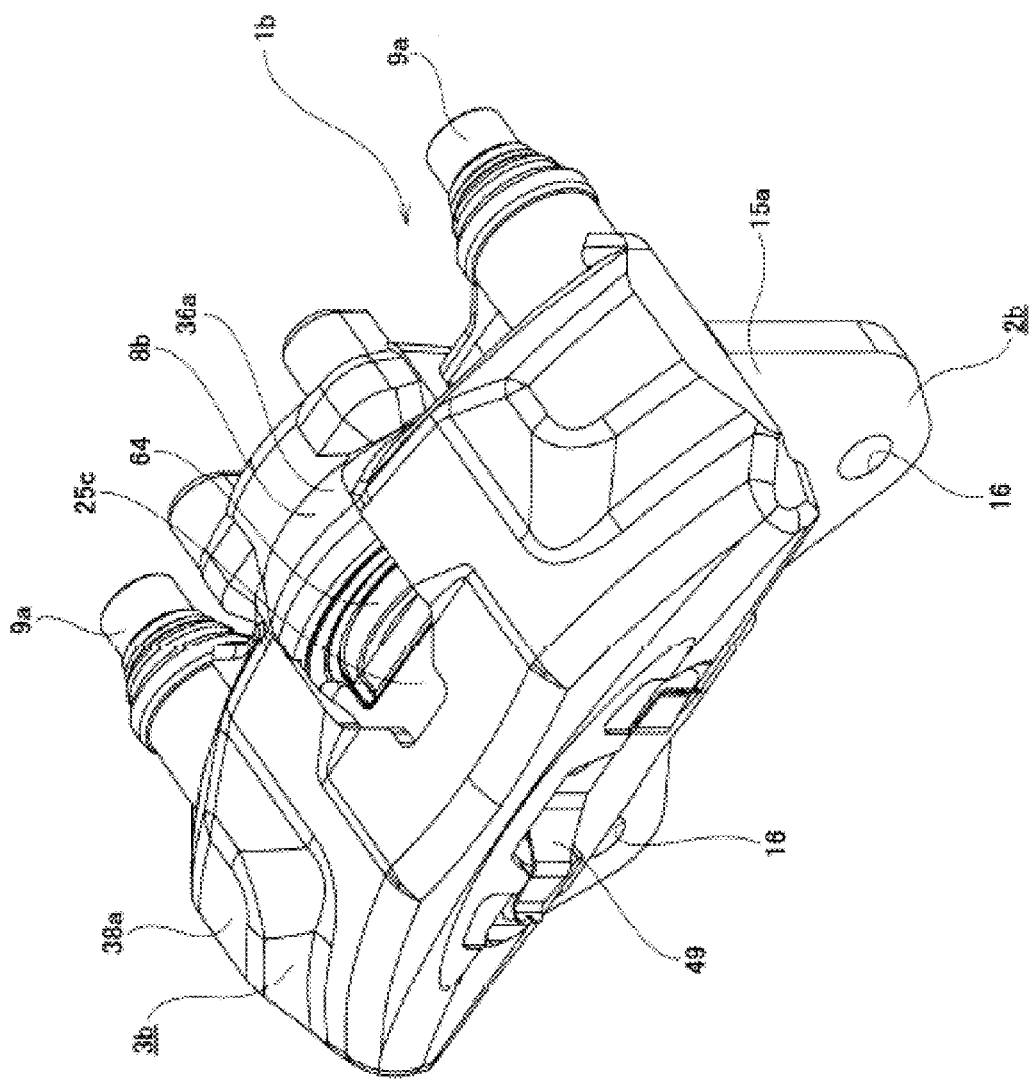
FIG. 23 is a perspective view of a floating type disc brake according to an eighth embodiment of the present invention.
Figure 24:
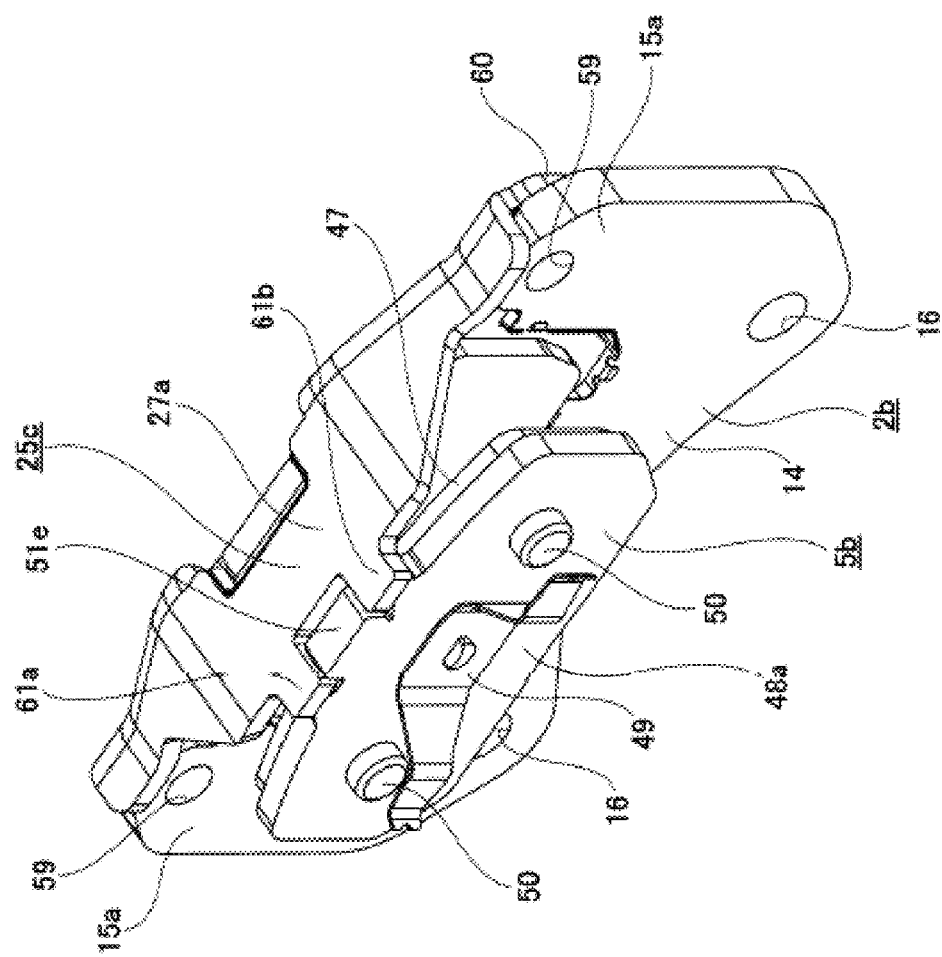
FIG. 24 is a view of FIG. 23 when a yoke is omitted.
Figure 25:
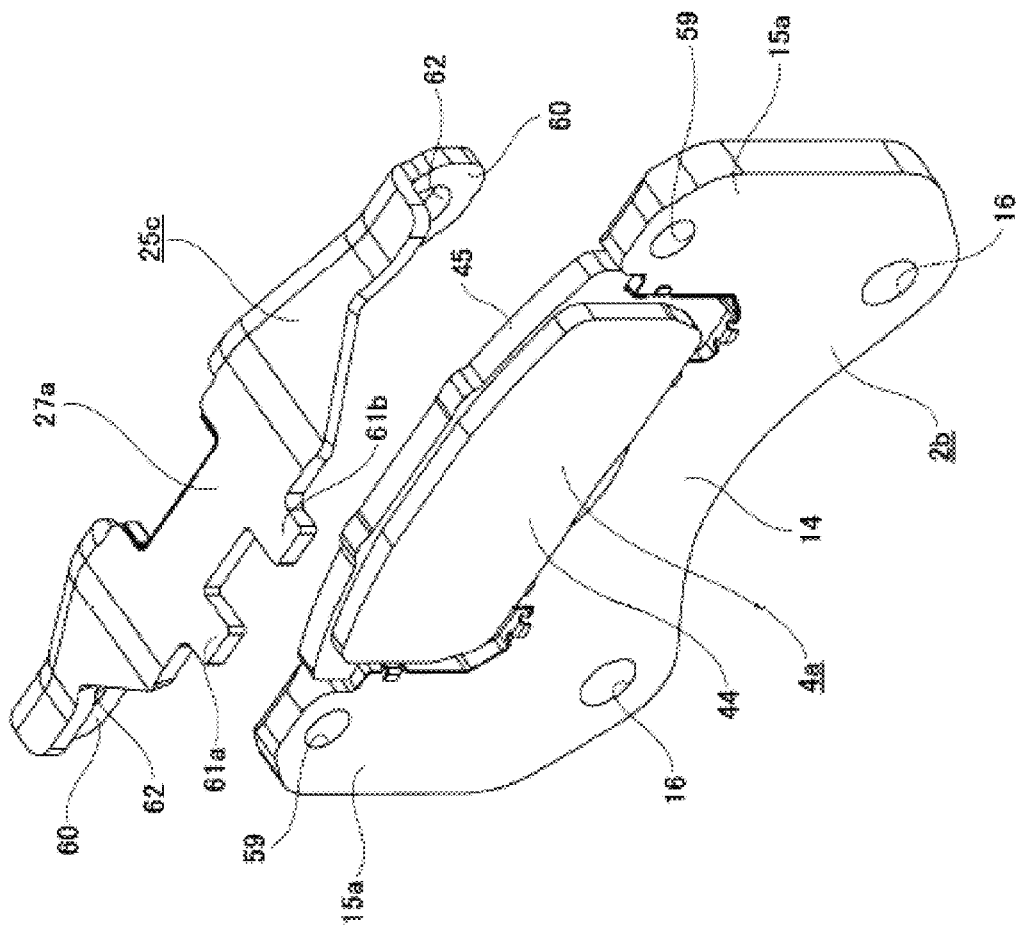
FIG. 25 is an exploded perspective view of FIG. 24 when an outer pad is omitted.

A seventh embodiment of the present invention will be described with reference to FIG. 22. In the seventh embodiment, a brake tangential force that acts on the outer pad 5a at the time of forward braking is directly borne by the anchor 25, and a brake tangential force that acts on the outer pad 5a at the time of backward braking is borne by the slide pins 9a (see FIG. 5).

For this reason, in a state where the constant-width portion 30 provided at an axially outer end portion of the anchor 25 is disposed between the pair of radial projections 51a, 51b provided on an outer peripheral edge portion of the outer pad 5a, sizes of a pair of gaps between two circumferentially outer surfaces of the constant-width portion 30 and circumferentially inner surfaces of the pair of radial projections 51a, 51b are different from each other. Specifically, a gap t1 between the constant-width portion 30 and the radial projection 51a provided on the other side in the circumferential direction (XB) is smaller than a gap t2 between the constant-width portion 30 and the radial projection 51b provided on the one side in the circumferential direction (XA), and is smaller than gaps between the axial projections 50 (see FIG. 5) and the reception holes 40 (see FIG. 5). The gap t2 between the constant-width portion 30 and the radial projection 51b provided on the one side in the circumferential direction (XA) is sufficiently larger than the gaps between the axial projections 50 and the reception holes 40.

In the seventh embodiment having the above configuration, the circumferentially inner surface of the radial projection 51*a* provided on the other side in the circumferential direction (XB) abuts against the circumferentially outer surface of the constant-width portion 30 at the time of forward braking. Therefore, the anchor 25 bears a brake tangential force that acts at the time of forward braking based on the abutment with the radial projection 51*a* of the outer pad 5*a* on the other side in the circumferential direction (XB). In contrast, at the time of backward braking, the circumferentially inner surface of the radial projection 51*b* provided on the one side in the circumferential direction (XA) does not abut against the circumferentially outer surface of the constant-width portion 30, and circumferentially outer surfaces of the axial projections 50 abut against circumferentially inner surfaces of the reception holes 40. Therefore, the brake tangential force that acts on the outer pad 5*a* at the time of backward braking is not borne by the anchor 25 but by the slide pins 9*a* via the yoke 3*a* (see FIG. 5).

Since the brake tangential force F2 that acts at the time of backward braking is sufficiently smaller than the brake tangential force F1 that acts at the time of forward braking, an inclination generated in the yoke 3*a* would not be a substantial problem. This is also advantageous in terms of preventing brake noise at the time of backward braking. In the seventh embodiment, the radial projection 51*b* is provided in terms of sharing the outer pad 5*a* by left and right wheels. However, the radial projection 51*b* may be omitted when the weight reduction is given priority.

Other configurations and functions and effects are the same as those of the first embodiment.

Eighth Embodiment

An eighth embodiment of the present invention will be described with reference to FIGS. 23 to 27. In a floating type disc brake 1*b* according to the eighth embodiment, similarly to the structure in the related art, a cylinder 8*b* is integrated with a yoke 3*b*. The cylinder 8*b* is fitted with only one piston 64 that is pushed toward the axially outer side. The cylinder 8*b* is a part of the yoke 3*b* and does not constitute a fixing member. Except a basic structure of the yoke 3*b*, a support structure of an outer pad 5*b* to the yoke 3*b* is substantially the same as the structure in the first embodiment.

The yoke 3*b* according to the eighth embodiment integrally includes the cylinder 8*b* at a circumferentially central portion of an inner body 36*a*, and is supported by a support 2*b* to be movable in the axial direction using the pair of slide pins 9*a*. The support 2*b* serves as a fixing member. Specifically, the slide pins 9*a* are inserted into slide holes provided on two circumferential sides of the inner body 36*a* from the axially inner side. Axially intermediate portions of the slide pins 9*a* are slidably disposed inside the slide holes. Top end portions of the slide pins 9*a* are screwed into fastening holes 59 provided at top end portions of support arm portions 15*a* constituting the support 2*b*. Accordingly, the slide pins 9*a* are fixed to the support 2*b* in the horizontal direction and the yoke 3*b* is supported by the slide pins 9*a* to be movable in the axial direction. In the eighth embodiment, a so-called U-shaped sheet metal support is used as the support 2*b*. The sheet metal support is obtained by applying press working such as punching or bending to a metal plate having sufficient strength and rigidity such as a steel plate.

In the eighth embodiment, the support 2*b* is provided with an anchor 25*c* that bears a brake tangential force that acts on the outer pad 5*b* at the time of braking. Similar to the support 2*b*, the anchor 25*c* is made by applying press working such as punching or bending to a metal plate having sufficient strength and rigidity such as a steel plate. The anchor 25*c* is a separated member from the support 2*b*. The anchor 25*c* is fixed to the top end portions of the support arm portions 15*a* using the slide pins 9*a*. Therefore, the anchor 25*c* is provided on the support 2*b* in a cantilever shape, and is disposed on the radially outer side relative to the rotor 6 (see FIG. 5) and the radially inner side relative to the yoke 3*b*.

The anchor 25*c* includes a long plate-shaped anchor body 27*a* that bridges between the top end portions of the pair of support arm portions 15*a* in the circumferential direction, and a pair of attachment portions 60 that are bent at right angles to the radially inner side from two circumferential side portions of the anchor body 27*a*. The anchor body 27*a* includes a pair of anchor projections 61*a*, 61*b* in a circumferentially intermediate portion of an axially outer end portion (top end portion). The pair of anchor projections 61*a*, 61*b* are spaced apart from each other in the circumferential direction. Cross-sections of circumferentially inner surfaces of the pair of anchor projections 61*a*, 61*b* have flat surface shapes parallel to each other. The pair of attachment portions 60 are formed with insertion holes 62 for inserting the slide pins 9*a* in the axial direction.

In the eighth embodiment, a radial projection 51*e* protruding toward the radially outer side is provided in a circumferentially central portion of an outer peripheral edge portion of a back plate 48*a* constituting the outer pad 5*b*. The radial projection 51*e* has a substantially rectangular cross-section and has a circumferential size for being disposed between the pair of anchor projections 61*a*, 61*b*. Specifically, in a state where the radial projection 51*e* is disposed (disposed in a neutral position) between the pair of anchor projections 61*a*, 61*b*, sizes of gaps between circumferentially outer surfaces of the radial projection 51*e* and the circumferentially inner surfaces of the anchor projections 61*a*, 61*b* are set to be smaller than those of gaps between the axial projections 50 provided on the outer pad 5*b* and the reception holes 40 (see FIG. 5) provided in the yoke 3*b*. In the eighth embodiment, a housing concave portion 41*a* that houses the anchor body 27*a* is formed on a radially inner surface of a bridge portion 38*a* constituting the yoke 3*b*.

In the eighth embodiment having the above configuration, the circumferentially outer surface of the radial projection 51*e* abuts against the circumferentially inner surface of the anchor projection 61*a* provided on one side in the circumferential direction at the time of forward braking. Therefore, the anchor 25*c* directly bears the brake tangential force F1 that acts at the time of forward braking based on the abutment with the radial projection 51*e* of the outer pad 5*b*. At the time of backward braking, the circumferentially outer surface of the radial projection 51*e* abuts against the circumferentially inner surface of the anchor projection 61*b* provided on the other side in the circumferential direction. Therefore, the anchor 25*c* directly bears the brake tangential force F2 that acts at the time of backward braking based on the abutment with the radial projection 51*e* of the outer pad 5*b*.

As described above, in the eighth embodiment, the anchor 25*c* provided on the yoke 3*b* can bear the brake tangential forces F1, F2 that act at the time of forward braking and backward braking. Therefore, an inclination (tilting) of the yoke 3*b* supporting the outer pad 5*b* can be prevented. As a result, uneven wear can be prevented from occurring on the outer pad 5*b* and abnormal sound (noise) such as acoustic noise at the time of braking can be prevented. In the eighth embodiment, since the anchor 25*c* is fixed to the pair of support arm portions 15a constituting the support 2b so as to bridge the pair of support arm portions 15a in the circumferential direction, sufficient strength can be ensured even when a sheet metal support is used as the support 2b. Besides, since the anchor 25c is fixed to the support 2b using the slide pins 9a, the number of components and the weight can be reduced.

Figure 27:
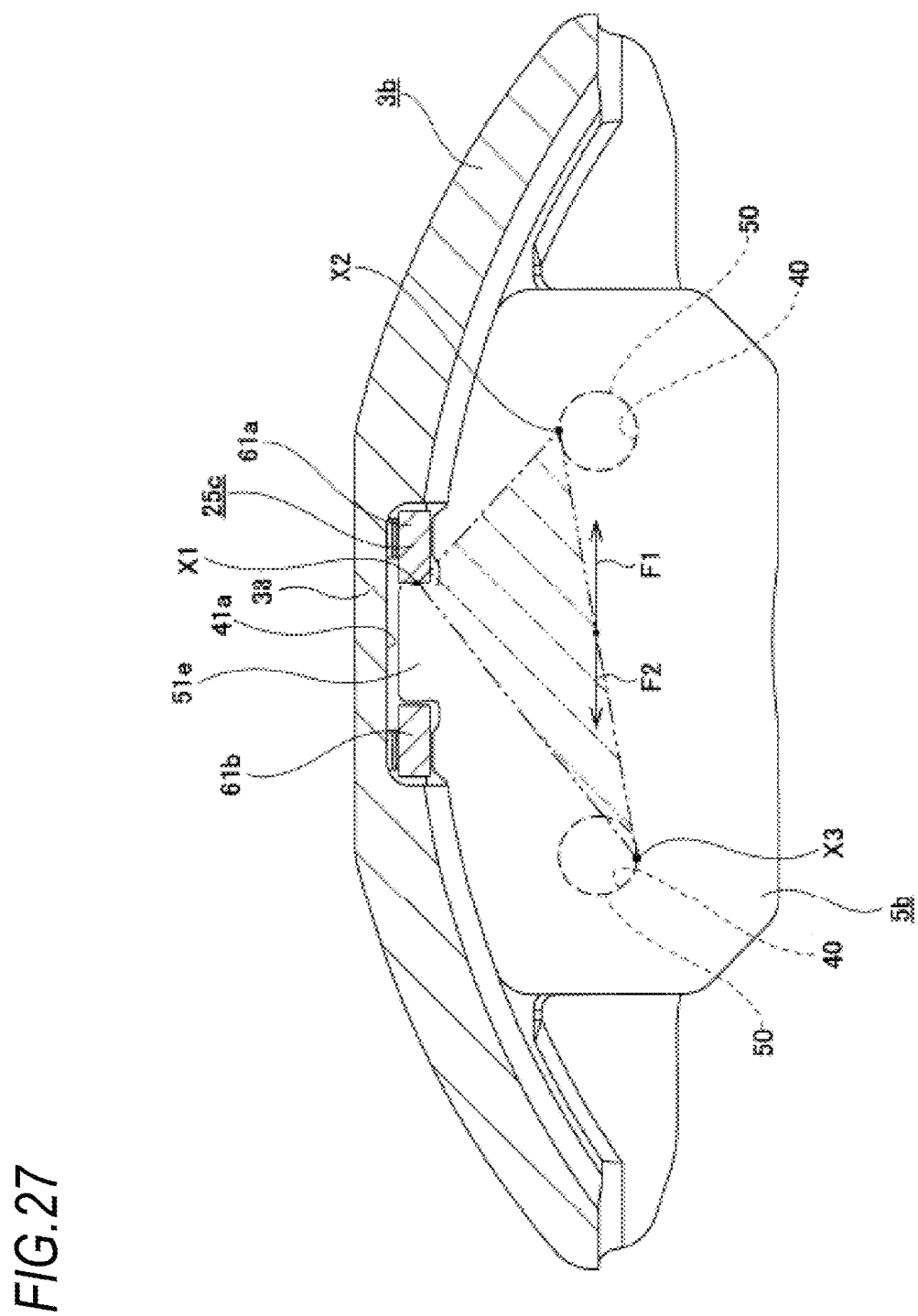
FIG. 27 shows the floating type disc brake according to the eighth embodiment of the present invention and corresponds to FIG. 7.

Also in the case of the eighth embodiment, a moment that attempts to rotate the outer pad 5b counterclockwise acts on the outer pad 5b at the time of forward braking. As shown in FIG. 27, the moment that acts on the outer pad 5b at the time of forward braking is borne by three bearing portions X1, X2, X3 including the first bearing portion X1 between the circumferentially outer surface of the radial projection 51e and the circumferentially inner surface of the anchor projection 61a, the second bearing portion X2 between a radially outer end portion of the axial projection 50 and a radially outer end portion of the reception hole 40 on the one side in the circumferential direction (rotation-out side, right side of FIG. 27), and the third bearing portion X3 between a radially inner end portion of the axial projection 50 and a radially inner end portion of the reception hole 40 on the other side in the circumferential direction (rotation-in side, left side of FIG. 27). Also in the case of the eight embodiment, the first bearing portion X1 of the three bearing portions X1, X2, X3 that bear the moment can be disposed on the radially outer side relative to the lining 47. Accordingly, uneven wear can be effectively prevented from occurring on an outer peripheral portion of the lining 47.

Figure 26:
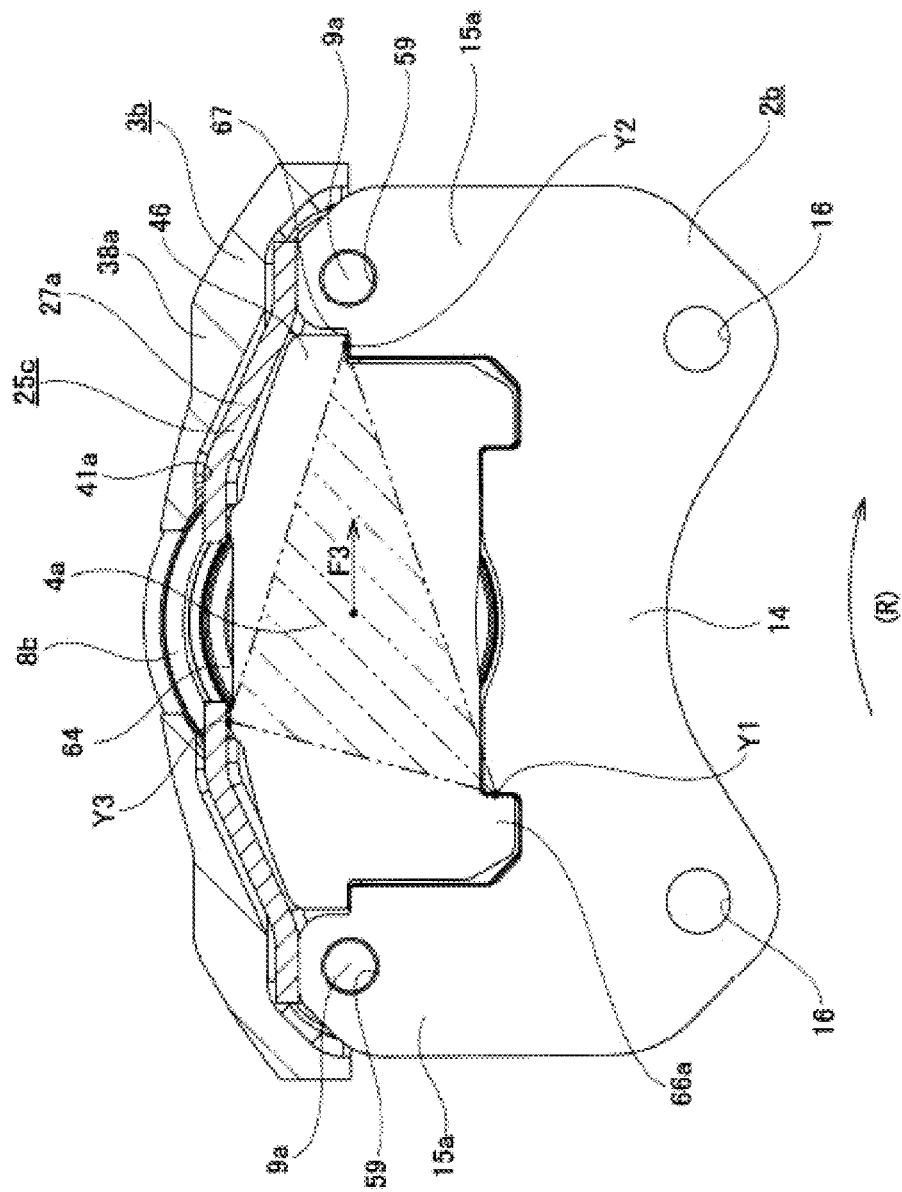
FIG. 26 shows the floating type disc brake according to the eighth embodiment of the present invention and corresponds to FIG. 6.

As shown in FIG. 26, when a rotation direction (R) of the rotor 6 in a forward movement of an automobile is clockwise, a brake tangential force F3 at the time of forward braking that is directed at one side in the circumferential direction (rotation-out side, right side of FIG. 26) acts on a friction surface center of the lining 44 constituting the inner pad 4a. Accordingly, the inner pad 4a moves to the one side in the circumferential direction, and a circumferentially inner surface of a projection 66a provided on a radially inner end portion of the back plate 45 on the other side in the circumferential direction (left side of FIG. 26) abuts against a part of the support base portion 14 constituting the support 2b. An abutment portion between the circumferentially inner surface of the projection 66a and the support base portion 14 is located on the radially inner side relative to an acting line of the brake tangential force F3. Accordingly, a moment that attempts to rotate the inner pad 4a clockwise acts on the inner pad 4a at the time of forward braking. In the eighth embodiment, the moment that acts on the inner pad 4a is borne by three bearing portions Y1, Y2, Y3 including the first bearing portion Y1 between the projection 66a and the support base portion 14, the second bearing portion Y2 between a radially inner surface of the ear portion 46 on the one side in the circumferential direction and a stepped surface 67 provided on the support arm portion 15a on the one side in the circumferential direction, and the third bearing portion Y3 between an outer peripheral edge portion of the back plate 45 and a radially inner surface of the anchor body 27a. In the eighth embodiment, the third bearing portion Y3 of the three bearing portions Y1, Y2, Y3 that bear the moment can be disposed on the radially outer side relative to the lining 44. Accordingly, uneven wear can be effectively prevented from occurring on an outer peripheral portion of the lining 44. Since the first bearing portion Y1 is disposed at the radially inner end portion of the back plate 45, uneven wear can be prevented from occurring on an inner peripheral portion of the lining 44. Since the first bearing portion Y1 and the second bearing portion Y2 are disposed at one end portion in the circumferential direction and the other end portion in the circumferential direction of the back plate 45, a large interval in the circumferential direction between the first bearing portion Y1 and the second bearing portion Y2 can be ensured and uneven wear can be prevented from occurring between a rotation-in part and a rotation-out part of the lining 44. In the eighth embodiment, by changing a radial position of the second bearing portion Y2, it is also possible to adjust (tune) the easiness of uneven wear on the outer peripheral portion and the inner peripheral portion of the one side portion in the circumferential direction of the lining 44.

Other configurations and functions and effects are the same as those of the first embodiment described above.

Ninth Embodiment

Figure 28:
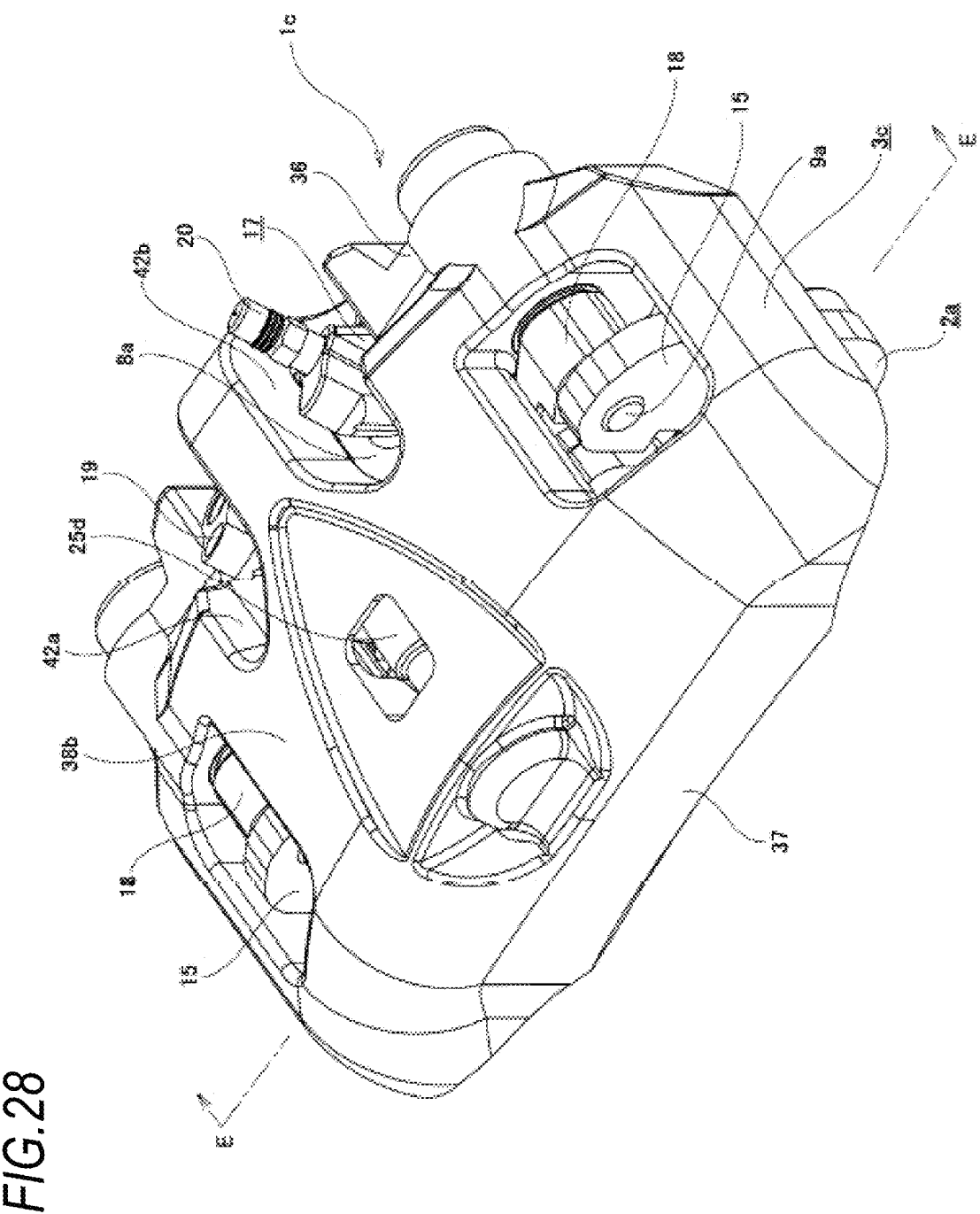
FIG. 28 is a perspective view of a floating type disc brake according to a ninth embodiment of the present invention.
Figure 29:
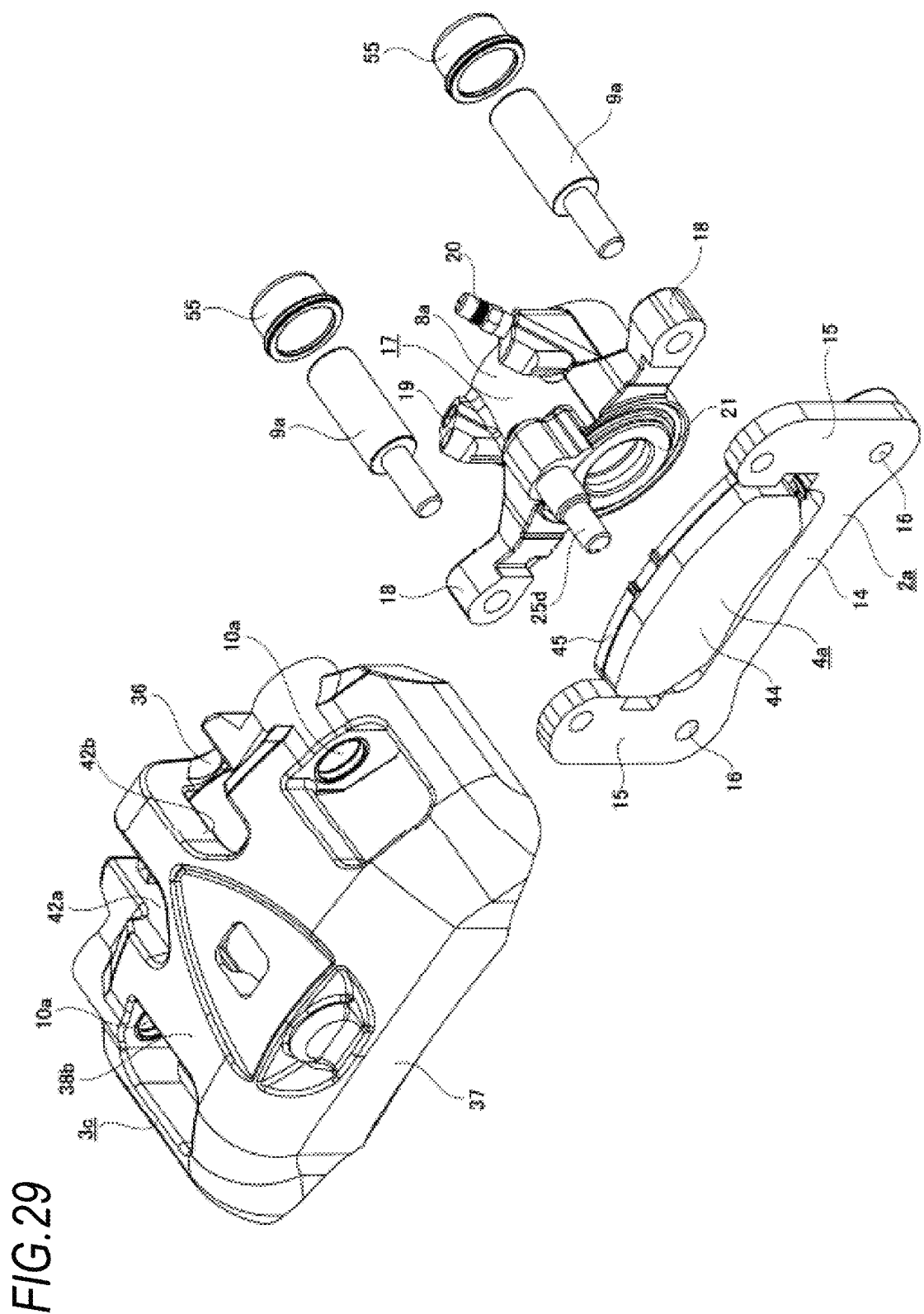
FIG. 29 is an exploded perspective view of FIG. 28.
Figure 30:
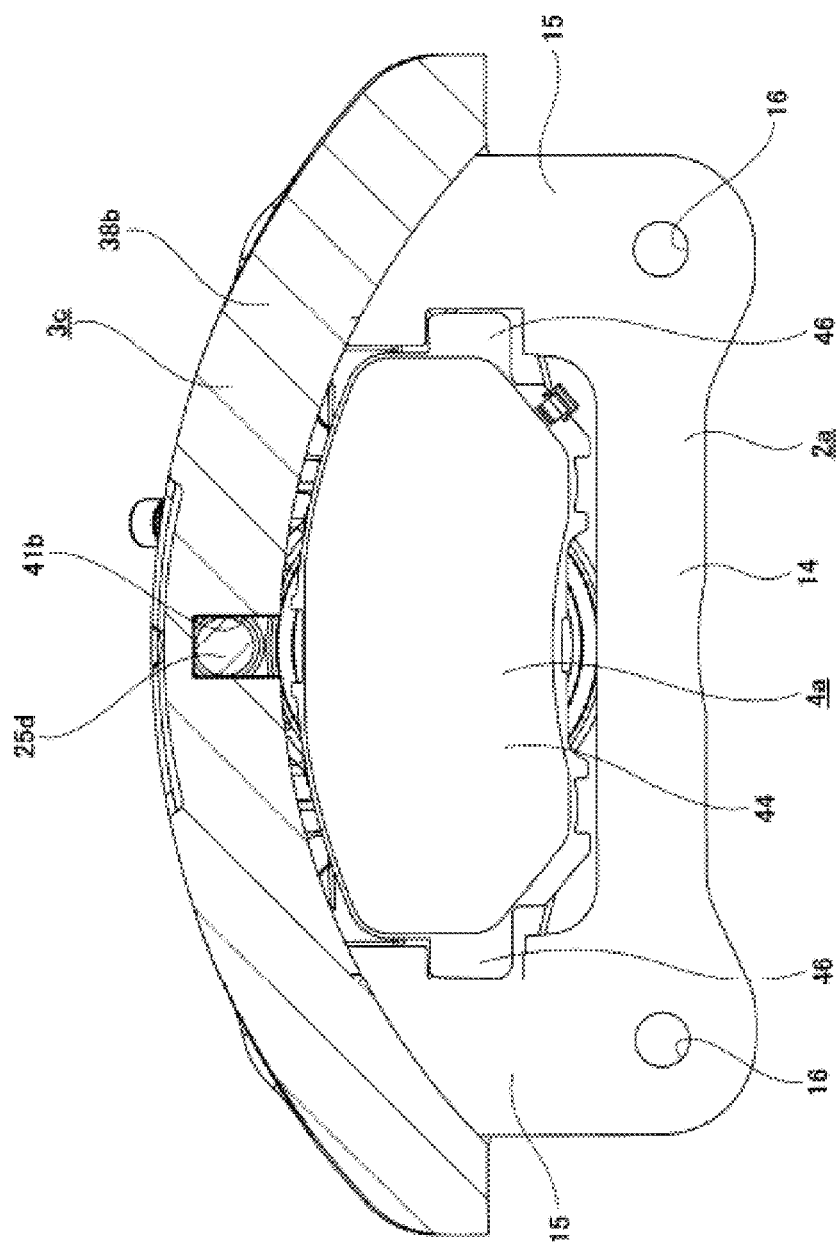
FIG. 30 is a cross-sectional view taken along a line E-E in FIG. 28.

A ninth embodiment of the present invention will be described with reference to FIGS. 28 to 30. In a floating type disc brake 1c according to the ninth embodiment, a brake tangential force that acts on an outer pad at the time of braking is not directly borne by an anchor 25d provided on the cylinder 8a, but is indirectly borne via a yoke 3c. Therefore, the axial size of the anchor 25d (protruding amount from the cylinder 8a) is smaller than that in the structure according to the first embodiment described above, and an axially outer end portion (top end portion) of the anchor 25d does not reach the radially outer side relative to a back plate constituting the outer pad. The outer pad is not provided with a radial projection to be engaged with the anchor 25d.

In the ninth embodiment, an axially inner end portion (base end portion) of the anchor 25d is integrated with a radially outer end portion of the cylinder 8a and the anchor 25d is provided to the cylinder 8a in a cantilever shape. The axially outer end portion to an intermediate portion of the anchor 25d are formed in a stepped columnar shape. Accordingly, the manufacturing cost of the anchor 25d is reduced to a low level.

A housing concave portion 41b is formed on a radially inner surface of a bridge portion 38b constituting the yoke 3c. The axially outer end portion of the anchor 25d is provided inside the housing concave portion 41b.

In the ninth embodiment having the configuration as described above, the axial projections 50 (see FIG. 5) provided on the outer pad abut against the reception holes 40 provided in the yoke 3c. By doing so, when the yoke 3c moves slightly in the circumferential direction, a circumferentially inner surface of the housing concave portion 41b abuts against an outer peripheral surface of the axially outer end portion of the anchor 25d. Therefore, the anchor 25d indirectly bears the brake tangential force that acts at the time of braking based on the abutment with the circumferentially inner surface of the housing concave portion 41b.

According to the ninth embodiment having the above configuration, the brake tangential force that acts on the outer pad at the time of braking can be made less likely to be transmitted to the slide pins 9a. Accordingly, an inclination of the yoke 3c can be prevented. As a result, uneven wear can be prevented from occurring on the outer pad 5a and abnormal sound (noise) such as acoustic noise at the time of braking can be prevented.

Other configurations and functions and effects are the same as those of the first embodiment described above.

Tenth Embodiment

Figure 31:
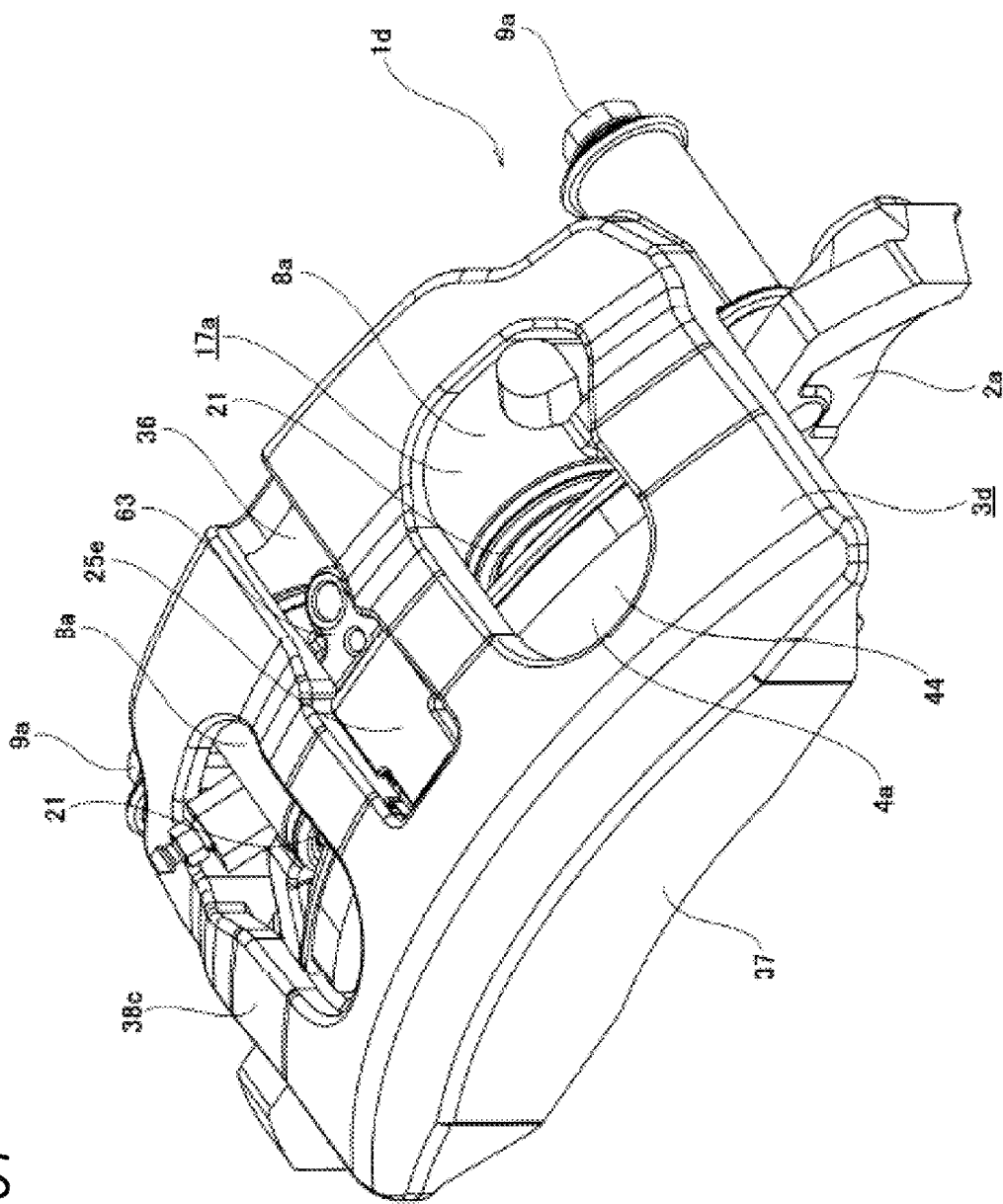
FIG. 31 is a perspective view of a floating type disc brake according to a tenth embodiment of the present invention.
Figure 32:
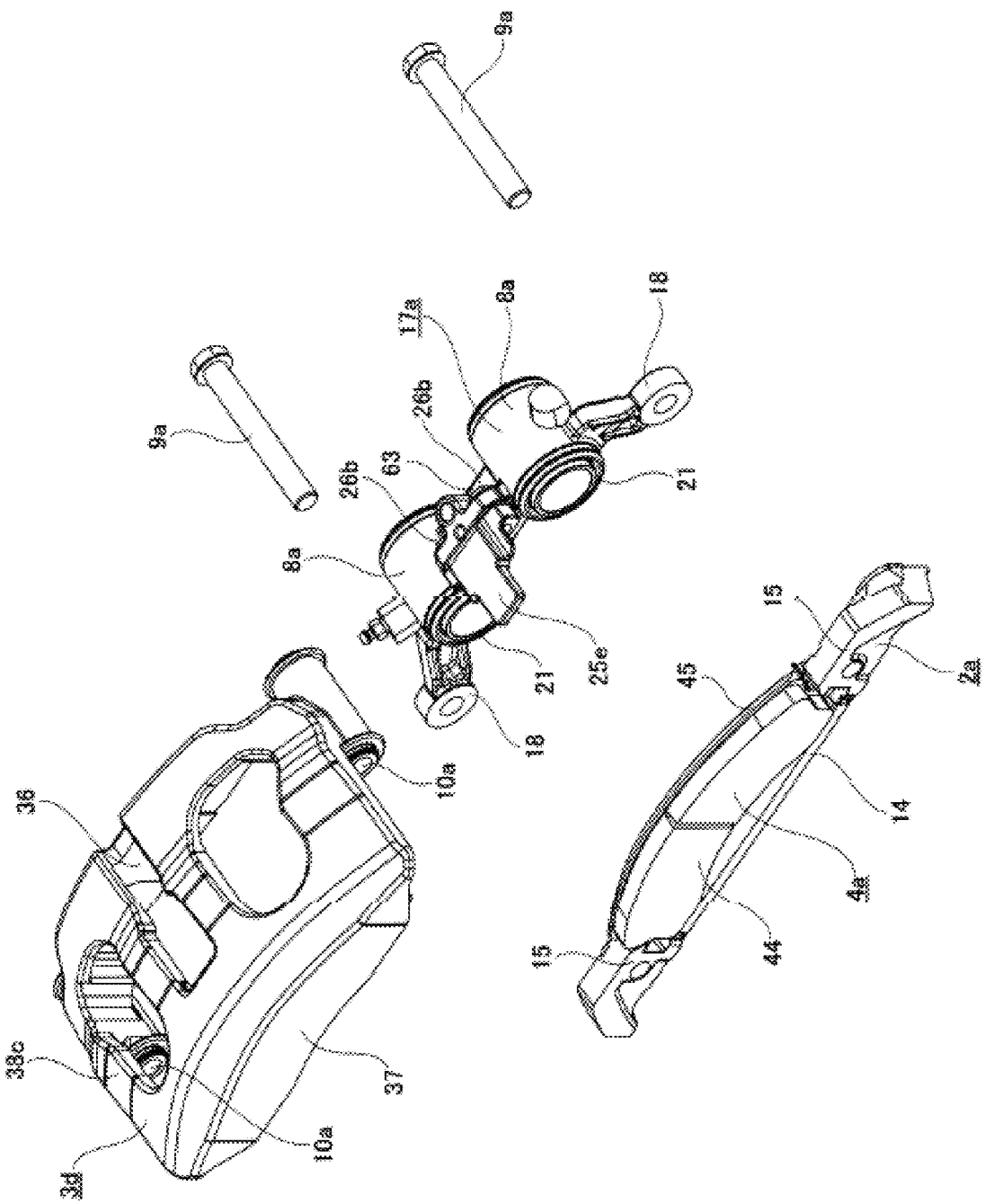
FIG. 32 is an exploded perspective view of FIG. 31.
Figure 33:
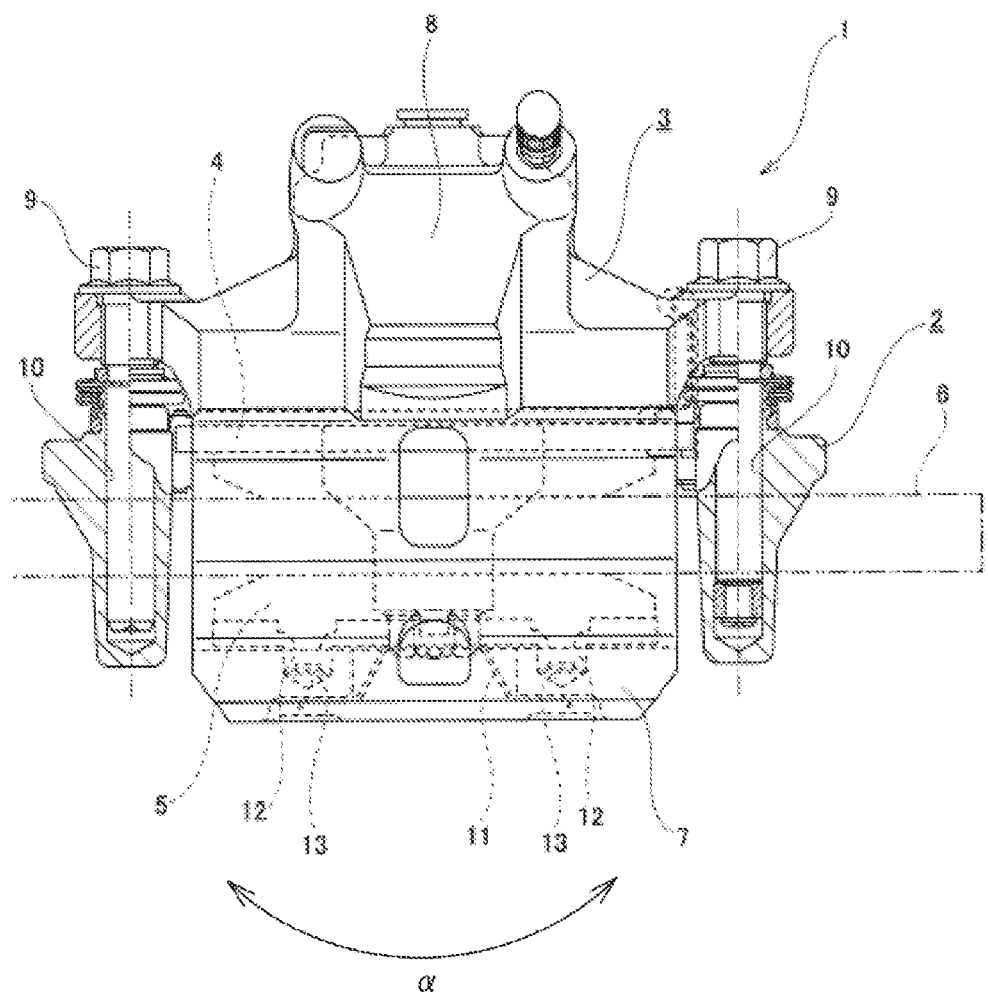
FIG. 33 is a cross-sectional view of a floating type disc brake having a structure in the related art when viewed from the radially outer side.

A tenth embodiment of the present invention will be described with reference to FIGS. 31 and 32. In a floating type disc brake 1*d* according to the tenth embodiment, two cylinders 8*a* for fitting the first piston 21 and the second piston 22 (see FIG. 5) are used as a cylinder unit 17*a*. The pair of cylinders 8*a* are spaced apart from each other in the circumferential direction and are coupled to each other by a circumferential coupling portion 63. In the tenth embodiment, an anchor 25*e* is not provided integrally with the cylinder unit 17*a* and is fixed to the cylinder unit 17*a* using a pair of bolts 26*b* serving as fastening members arranged in the circumferential direction. More specifically, the anchor 25*e* is fixed to the circumferential coupling portion 63. An axially outer end portion to an intermediate portion of the anchor 25*e* are formed in a rectangular flat plate shape. Similar to the structure according to the ninth embodiment, the axially outer end portion of the anchor 25*e* is disposed inside a housing concave portion formed on a radially inner surface of a bridge portion 38*c* constituting the yoke 3*d*.

Also in a case of the tenth embodiment having the above configuration, a brake tangential force that acts at the time of braking is indirectly borne by the anchor 25*e* based on the abutment between a circumferentially inner surface of the housing concave portion provided on the yoke 3*d*. Accordingly, the brake tangential force that acts on an outer pad at the time of braking can be made less likely to be transmitted to the slide pins 9*a*. Since the anchor 25*e* is formed in a rectangular flat plate shape, the thickness size in the radial direction can be reduced and rigidity in the circumferential direction can be ensured.

Other configurations and functions and effects are the same as those of the first and the ninth embodiments described above.

The present invention can be implemented by appropriately combining structures of the embodiments as long as no contradiction occurs.

Features of the embodiments of the floating type disc brake according to the present invention will be briefly summarized below.

[1] A floating type disc brake (1*a* to 1*d*) includes:
an outer pad (5*a*, 5*b*) disposed on an axially outer side (ZO) relative to a rotor (6);
an inner pad (4*a*) disposed on an axially inner side (ZI) relative to the rotor (6);
a fixing member (support 2*a*, cylinder unit 17, 17*a*, support 2*b*) disposed on the axially inner side (ZI) relative to the rotor (6), supporting the inner pad (4*a*) to be movable in an axial direction (Z), and fixed to a vehicle body; and
a yoke (3*a* to 3*d*) supported to the fixing member (support 2*a*, cylinder unit 17, 17*a* support 2*b*) via a slide pin (9*a*) to be movable in the axial direction (Z) in a state where the yoke (3*a* to 3*d*) suppors the outer pad (5*a*, 5*b*),
wherein the fixing member (support 2*a*, cylinder unit 17, 17*a*, support 2*b*) is provided with an anchor (25, 25*a* to 25*e*) disposed on a radially outer side (YO) relative to the rotor (6), the anchor (25, 25*a* to 25*e*) being configured to bear a brake tangential force that acts on the outer pad (5*a*, 5*b*) at the time of braking within a circumferential range of a lining (47) provided in the outer pad (5*a*, 5*b*).

[2] The floating type disc brake (1*a*) according to [1], wherein the anchor (25) directly bears the brake tangential force that acts on the outer pad (5*a*) at the time of braking based on abutment with the outer pad (5*a*).

[3] The floating type disc brake (1*a*) according to [1] or [2], wherein the fixing member includes a support (support 2*a*) that supports the inner pad (4*a*) to be movable in the axial direction (Z), and a cylinder (8*a*) in which a piston (first piston 21, second piston 22) is fitted, and the anchor (25) is provided to the cylinder (8*a*) in a cantilever shape.

[4] The floating type disc brake (1*a*) according to [3], wherein the anchor (25) is provided at a radially outer end portion of the cylinder (8*a*) and includes a relief concave portion (32) on a radially inner surface of the anchor, the relief concave portion (32) being configured to mount a boot (31*a*) to an axially outer end portion of the cylinder (8*a*).

[5] The floating type disc brake (1*b*) according to [1] or [2], wherein the yoke (3*b*) includes a cylinder (8*b*) in which a piston (64) is fitted, the fixing member includes a support (2*b*) that supports the inner pad (4*a*) to be movable in the axial direction (Z), and the anchor (25*c*) is provided to the support (2*b*).

[6] The floating type disc brake (1*a*) according to any one of [1] to [5], wherein the anchor (25) is provided in a position where the anchor (25) radially overlaps a circumferentially central portion ($S_{47}$) of the lining (47) provided in the outer pad (5*a*).

[7] The floating type disc brake (1*a*) according to any one of [1] to [6], wherein a portion (constant-width portion 30) of the anchor (25) that abuts against a mating surface (radial projections 51*a*, 51*b*) at the time of braking has a convex arc-shaped cross-section.

[8] The floating type disc brake (1*a*) according to any one of [1] to [7], wherein a mating surface (radial projections 51*c*, 51*d*) that abuts against the anchor (25) at the time of braking has a convex arc-shaped cross-section.

[9] The floating type disc brake (1*a*) according to any one of [1] to [8], wherein a circumferential position of an abutment portion (P1) between the anchor (25) and a mating surface (radial projection 51*a*) at the time of forward braking is located on a rotation-in side relative to a circumferentially central portion ($S_{47}$) of the lining (47) provided in the outer pad (5*a*).

[10] The floating type disc brake (1*a*) according to any one of [1] to [9], wherein the anchor (25) has a circumferential size that is larger than or equal to a radial size of the anchor (25).

[11] The floating type disc brake (1*a*) according to any one of [1] to [10], wherein the anchor (25) includes a tapered portion (29) whose circumferential size decreases toward the axially outer side.

[12] The floating type disc brake (1*a*) according to any one of [1] to [11], wherein the anchor (25*b*) has an asymmetrical shape in a circumferential direction.

[13] The floating type disc brake (1*a*, 1*d*) according to any one of [1] to [12], wherein the anchor (25, 25*a* to 25*c*, 25*e*) is a separated member from the fixing member (cylinder 8*a*, support 2*b*) and is attached to the fixing member (cylinder 8*a*, support 2*b*).

[14] The floating type disc brake (1*a*) according to [13], wherein a positioning means (57) is provided between the anchor (25) and the fixing member (cylinder 8*a*), the positioning means (57) being configured to position the anchor (25) with respect to the fixing member (cylinder 8a) in a circumferential direction by mechanical engagement.

[15] The floating type disc brake (1a, 1d) according to [13] or [14],
wherein the anchor (25e) is fixed to the fixing member (cylinder unit 17a) by a fastening member (bolts 26, 26a, 26b).

[16] The floating type disc brake (1d) according to [15], wherein the fastening member (bolts 26, 26b) is disposed in the axial direction (Z).

[17] The floating type disc brake (1d) according to [16], wherein a radial position of a central axis of the fastening member (bolt 26b) is located within a radial size of the anchor (25e).

[18] The floating type disc brake (1a) according to [15], wherein the fastening member (bolt 26a) is disposed in a radial direction.

[19] The floating type disc brake (1c) according to any one of [1] to [12],
wherein the anchor (25d) is integrated with the fixing member (cylinder 8a).

[20] The floating type disc brake (1a) according to any one of [1] to [19],
wherein a housing concave portion (41) that houses the anchor (25) is provided on a radially inner surface of a bridge portion (38) of the yoke (3a) disposed on the radially outer side relative to the rotor (6).

[21] The floating type disc brake (1a, 1b, 1c, 1d) according to any one of [1] to [20],
wherein the anchor (25, 25b, 25c, 25d) bears brake tangential forces that act on the outer pad (5a, 5b) at the time of forward braking and backward braking.

[22] The floating type disc brake (1a) according to any one of [1] to [20],
wherein the anchor (25) bears only a brake tangential force that acts on the outer pad (5a) at the time of forward braking, and a brake tangential force that acts on the outer pad (5a) at the time of backward braking is borne by the slide pin (9a) via the yoke (3a).

[23] The floating type disc brake (1a to 1d) according to any one of [1] to [22],
wherein the anchor (25, 25a to 25d) also bears a force (moment force) that is directed at the radially outer side and acts on the outer pad (5a, 5b).

[24] The floating type disc brake (1c) according to [1], wherein the anchor (25d) indirectly bears the brake tangential force that acts on the outer pad (5a) at the time of braking via the yoke (3c) based on abutment with the yoke (3c).

[25] The floating type disc brake (1b) according to any one of [1] to [24],
wherein the inner pad (4a) bears a moment that acts at the time of braking by three bearing portions (Y1, Y2, Y3), and one bearing portion (Y3) of the three bearing portions which is an abutment portion with the anchor (25c) is located on the radially outer side relative to a lining (44) provided in the inner pad (4a).

Although the embodiments are described above with reference to the drawings, it is needless to say that the present invention is not limited thereto. It will be apparent to those skilled in the art that various changes and modifications may be conceived within the scope of the claims. It is also understood that the various changes and modifications belong to the technical scope of the present invention.

Elements in the above-described embodiments may be arbitrarily combined within a range not departing from the spirit of the present invention.

The present application is based on Japanese Patent Application No. 2018-059774 filed on Mar. 27, 2018, contents of which are incorporated herein by reference.

INDUSTRIAL APPLICABILITY

According to the floating type disc brake of the present invention, it is possible to prevent an inclination of a yoke supporting an outer pad regardless of a brake tangential force that acts on the outer pad at the time of braking. As a result, a part of the outer pad is less likely to contact a rotor, uneven wear is less likely to occur in the outer pad, and abnormal sound (noise) such as acoustic noise is less likely to generate at the time of braking.

REFERENCE SIGNS LIST 1, 1a to 1d floating type disc brake
2, 2a, 2b support
3, 3a to 3d yoke
4, 4a inner pad
5, 5a, 5b outer pad
6 rotor
7 claw portion
8, 8a, 8b cylinder
9, 9a slide pin
10, 10a slide hole
11 pad spring
12 axial projection
13 reception hole
14 support base portion
15 support arm portion
16 attachment hole
17, 17a cylinder unit
18 cylinder arm portion
19 piping port
20 bleeder
21 first piston
22 second piston
23 female screw hole
24 fixing screw
25, 25a to 25e anchor
26, 26a bolt
27, 27a anchor body
28, 28a attachment flange
29 tapered portion
30, 30a constant-width portion
31a, 31b boot
32 relief concave portion
33 attachment seat
34 stepped surface
35a, 35b small-diameter portion
36, 36a inner body
37 outer body
38, 38a to 38c bridge portion
39 support hole
40 reception hole
41, 41a, 41b housing concave portion
42a, 42b inner window portion
43 outer window portion
44 lining
45 back plate
46 ear portion
47 lining 48 back plate
49 pad spring
50 axial projection
51a to 51e radial projection
52a, 52b seal member
55 boot
56 coupling portion
57 positioning means
58 wall portion
59 fastening hole
60 attachment portion
61a, 61b anchor projection
62 insertion hole
63 circumferential coupling portion
64 piston
65 engagement concave portion
66, 66a projection
67 stepped surface

The invention claimed is:

1. A floating type disc brake comprising:
an outer pad disposed on an axially outer side relative to a rotor;
an inner pad disposed on an axially inner side relative to the rotor;
a fixing member disposed on the axially inner side relative to the rotor, supporting the inner pad to be movable in an axial direction, and fixed to a vehicle body; and
a yoke supported to the fixing member via a slide pin to be movable in the axial direction in a state where the yoke supports the outer pad,
wherein the fixing member is provided with an anchor disposed on a radially outer side relative to the rotor, the anchor being configured to bear a brake tangential force that acts on the outer pad at the time of braking within a circumferential range of a lining provided in the outer pad, and
wherein the fixing member includes a support that supports the inner pad to be movable in the axial direction, and a cylinder in which a piston is fitted, and the anchor is provided to the cylinder in a cantilever shape.

2. The floating type disc brake according to claim 1,
wherein the anchor directly bears the brake tangential force that acts on the outer pad at the time of braking based on abutment with the outer pad.

3. The floating type disc brake according to claim 1,
wherein the anchor is provided at a radially outer end portion of the cylinder and includes a relief concave portion on a radially inner surface of the anchor, the relief concave portion being configured to mount a boot to an axially outer end portion of the cylinder.

4. The floating type disc brake according to claim 1,
wherein the yoke includes a cylinder in which a piston is fitted, the fixing member includes a support that supports the inner pad to be movable in the axial direction, and the anchor is provided to the support.

5. The floating type disc brake according to claim 1,
wherein the anchor is provided in a position where the anchor radially overlaps a circumferentially central portion of the lining provided in the outer pad.

6. The floating type disc brake according to claim 1,
wherein a portion of the anchor that abuts against a mating surface at the time of braking has a convex arc-shaped cross-section.

7. The floating type disc brake according to claim 1,
wherein a mating surface that abuts against the anchor at the time of braking has a convex arc-shaped cross-section.

8. The floating type disc brake according to claim 1,
wherein a circumferential position of an abutment portion between the anchor and a mating surface at the time of forward braking is located on a rotation-in side relative to a circumferentially central portion of the lining provided in the outer pad.

9. The floating type disc brake according to claim 1,
wherein the anchor has a circumferential size that is larger than or equal to a radial size of the anchor.

10. The floating type disc brake according to claim 1,
wherein the anchor includes a tapered portion whose circumferential size decreases toward the axially outer side relative to the rotor.

11. The floating type disc brake according to claim 1,
wherein the anchor has an asymmetrical shape in a circumferential direction.

12. The floating type disc brake according to claim 1,
wherein the anchor is a separated member from the fixing member and is attached to the fixing member.

13. The floating type disc brake according to claim 12,
wherein a positioning part is provided between the anchor and the fixing member, the positioning part being configured to position the anchor with respect to the fixing member in a circumferential direction by mechanical engagement.

14. The floating type disc brake according to claim 12,
wherein the anchor is fixed to the fixing member by a fastening member.

15. The floating type disc brake according to claim 14,
wherein the fastening member is disposed in the axial direction.

16. The floating type disc brake according to claim 15,
wherein a radial position of a central axis of the fastening member is located within a radial size of the anchor.

17. The floating type disc brake according to claim 14,
wherein the fastening member is disposed in a radial direction.

18. The floating type disc brake according to claim 1,
wherein the anchor is integrated with the fixing member.

19. The floating type disc brake according to claim 1,
wherein a housing concave portion that houses the anchor is provided on a radially inner surface of a bridge portion of the yoke disposed on the radially outer side relative to the rotor.

20. The floating type disc brake according to claim 1,
wherein the anchor bears brake tangential forces that act on the outer pad at the time of forward braking and backward braking.

21. The floating type disc brake according to claim 1,
wherein the anchor bears only a brake tangential force that acts on the outer pad at the time of forward braking, and a brake tangential force that acts on the outer pad at the time of backward braking is borne by the slide pin via the yoke.

22. The floating type disc brake according to claim 1,
wherein the anchor also bears a force that is directed at the radially outer side and acts on the outer pad.

23. The floating type disc brake according to claim 1,
wherein the anchor indirectly bears the brake tangential force that acts on the outer pad at the time of braking via the yoke based on abutment with the yoke.

24. The floating type disc brake according to claim 1,
wherein the inner pad bears a moment that acts at the time of braking by three bearing portions, and one bearing portion of the three bearing portions which is an abutment portion with the anchor is located on the radially outer side relative to a lining provided in the inner pad.

\* \* \* \* \*